US011310261B2

(12) United States Patent
Hawthorn et al.

(10) Patent No.: US 11,310,261 B2
(45) **Date of Patent: *Apr. 19, 2022**

(54) ASSESSING SECURITY RISKS OF USERS IN A COMPUTING NETWORK

(71) Applicant: Proofpoint, Inc., Sunnyvale, CA (US)

(72) Inventors: Trevor Tyler Hawthorn, Ashburn, VA (US); Norman Sadeh-Koniecpol, Pittsburgh, PA (US); Nathan Miller, Haymarket, VA (US); Jeff Losapio, Herndon, VA (US); Kurt Wescoe, Pittsburgh, PA (US); Jason Brubaker, Mechanicsburg, PA (US); Jason Hong, Pittsburgh, PA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,801

(22) Filed: Jun. 24, 2020

(65) Prior Publication Data

US 2021/0021632 A1 Jan. 21, 2021

Related U.S. Application Data

(63) Continuation of application No. 15/492,396, filed on Apr. 20, 2017, now Pat. No. 10,749,887, which is a continuation-in-part of application No. 15/418,867, filed on Jan. 30, 2017, now Pat. No. 9,870,715, which is a continuation-in-part of application No. 14/620,866, filed on Feb. 12, 2015, now abandoned, which is a continuation of application No.

(Continued)

(51) Int. Cl.
*H04L 29/06* (2006.01)
*G06F 21/55* (2013.01)

(52) U.S. Cl.
CPC .......... *H04L 63/1433* (2013.01); *G06F 21/55* (2013.01); *H04L 63/1408* (2013.01)

(58) Field of Classification Search
CPC . H04L 63/14; H04L 63/1408; H04L 63/1433; H04L 63/1483; H04L 63/149; G06F 21/55
See application file for complete search history.

(56) References Cited

U.S. PATENT DOCUMENTS 6,324,647 B1 11/2001 Bowman-Amuah
6,634,887 B1 10/2003 Heffernan, III et al.

(Continued)

OTHER PUBLICATIONS

Sep. 18, 2019 U.S. Non-Final Office Action—U.S. Appl. No. 15/492,396.

(Continued)

*Primary Examiner* — Daniel B Potratz
(74) *Attorney, Agent, or Firm* — Elizabeth A. Almeter

(57) ABSTRACT

Various embodiments assess security risks of users in computing networks. In some embodiments, an interaction item is sent to an end user electronic device. When the end user interacts with the interaction item, the system collects feedback data that includes information about the user's interaction with the interaction item, as well as technical information about the electronic device. The feedback is compared to a plurality of security risk scoring metrics. Based on this comparison, a security risk score for the user with respect to a computing network.

20 Claims, 26 Drawing Sheets

Related U.S. Application Data

14/216,002, filed on Mar. 17, 2014, now Pat. No. 9,558,677, which is a continuation-in-part of application No. 13/832,070, filed on Mar. 15, 2013, now Pat. No. 9,280,911, which is a continuation-in-part of application No. 13/442,587, filed on Apr. 9, 2012, now Pat. No. 9,547,998, which is a continuation of application No. 13/442,587, filed on Apr. 9, 2012, now Pat. No. 9,547,998.

(60) Provisional application No. 61/939,450, filed on Feb. 13, 2014, provisional application No. 61/793,011, filed on Mar. 15, 2013, provisional application No. 61/473,366, filed on Apr. 8, 2011, provisional application No. 61/473,384, filed on Apr. 8, 2011.

(56) References Cited

U.S. PATENT DOCUMENTS 6,954,858 B1 10/2005 Welborn et al.
7,092,861 B1 8/2006 Shteyn
7,325,252 B2 1/2008 Bunker, V et al.
7,457,823 B2 11/2008 Shraim et al.
7,486,666 B2 2/2009 Meyer
7,761,618 B2 7/2010 Avraham et al.
8,046,374 B1 10/2011 Bromwich
8,063,765 B2 11/2011 Johnson et al.
8,146,164 B2 3/2012 Eshun et al.
8,205,255 B2 6/2012 Benea et al.
8,220,047 B1 7/2012 Soghoian et al.
8,255,393 B1 8/2012 Yu et al.
8,266,320 B1 9/2012 Bell et al.
8,321,945 B2 11/2012 Nakagawa
8,341,691 B2 12/2012 Bezilla et al.
8,402,528 B1 3/2013 McCorkendale et al.
8,423,483 B2 4/2013 Sadeh-Koniecpol et al.
8,448,245 B2 5/2013 Banerjee et al.
8,457,594 B2 6/2013 Stevens et al.
8,464,346 B2 6/2013 Barai et al.
8,468,244 B2 6/2013 Redlich et al.
8,468,279 B2 6/2013 Khosravi et al.
8,478,860 B2 7/2013 Roberts et al.
8,484,741 B1 * 7/2013 Chapman ............. G06Q 10/107 726/25
8,495,700 B2 7/2013 Shahbazi
8,532,970 B2 9/2013 White et al.
8,533,847 B2 9/2013 Kedem
8,560,709 B1 10/2013 Shokhor et al.
8,560,864 B2 10/2013 Chang et al.
8,561,134 B2 10/2013 Bezilla et al.
8,608,487 B2 12/2013 Huie et al.
8,615,807 B1 * 12/2013 Higbee ................. G06F 21/577 726/25
8,635,703 B1 1/2014 Belani et al.
8,646,028 B2 2/2014 McKenzie et al.
8,656,095 B2 2/2014 Coulter
8,683,588 B2 3/2014 Esteban et al.
8,707,180 B2 4/2014 Butler et al.
8,719,925 B1 5/2014 Berg
8,719,940 B1 5/2014 Higbee et al.
8,751,629 B2 6/2014 White et al.
8,763,126 B2 6/2014 Wang et al.
8,769,684 B2 7/2014 Stolfo et al.
8,776,170 B2 7/2014 Bezilla et al.
8,782,745 B2 7/2014 Stevens et al.
8,793,795 B1 7/2014 Ravid
8,793,799 B2 7/2014 Fritzson et al.
8,819,825 B2 8/2014 Keromytis et al.
8,819,858 B2 8/2014 Mandava
8,914,846 B2 12/2014 Bezilla et al.
8,918,872 B2 12/2014 Kumar et al.
8,931,101 B2 1/2015 Baluda et al.
8,943,554 B2 1/2015 Tran et al.
8,955,109 B1 2/2015 Satish
8,966,637 B2 2/2015 Belani et al.
8,978,151 B1 3/2015 Chamberlain
9,009,835 B2 4/2015 Yoo
9,015,789 B2 4/2015 Thomas
9,027,134 B2 5/2015 Foster et al.
9,031,536 B2 5/2015 Fitzgerald et al.
9,065,826 B2 6/2015 Colvin et al.
9,069,961 B2 6/2015 Khosravi et al.
9,076,132 B2 7/2015 Golan et al.
9,118,665 B2 8/2015 Krahn et al.
9,118,702 B2 8/2015 MaCaulay
9,141,792 B2 9/2015 Baluda et al.
9,143,529 B2 9/2015 Qureshi et al.
9,154,523 B2 10/2015 Bezilla et al.
9,215,250 B2 12/2015 Porten et al.
9,246,936 B1 1/2016 Belani et al.
9,253,207 B2 2/2016 Higbee et al.
9,262,629 B2 2/2016 Belani et al.
9,280,911 B2 3/2016 Sadeh-Koniecpol et al.
9,330,257 B2 5/2016 Valencia et al.
9,356,948 B2 5/2016 Higbee et al.
9,367,484 B2 6/2016 Hogan et al.
9,373,267 B2 6/2016 Sadeh-Koniecpol et al.
9,392,024 B2 7/2016 Bezilla et al.
9,398,029 B2 7/2016 Sadeh-Koniecpol et al.
9,398,038 B2 7/2016 Higbee et al.
9,426,179 B2 8/2016 Keene et al.
9,674,212 B2 6/2017 Foster et al.
9,674,214 B2 6/2017 Foster et al.
2002/0091940 A1 7/2002 Welborn et al.
2004/0107345 A1 6/2004 Brandt et al.
2004/0123153 A1 6/2004 Wright et al.
2005/0170326 A1 8/2005 Koehler et al.
2005/0183143 A1 8/2005 Anderholm et al.
2006/0037076 A1 2/2006 Roy
2006/0075024 A1 4/2006 Zircher et al.
2006/0224742 A1 10/2006 Shahbazi
2006/0253906 A1 11/2006 Rubin et al.
2007/0112714 A1 5/2007 Fairweather
2007/0180525 A1 8/2007 Bagnall
2007/0226796 A1 9/2007 Gilbert et al.
2007/0245422 A1 10/2007 Hwang et al.
2007/0271613 A1 11/2007 Joyce
2008/0052359 A1 2/2008 Golan et al.
2008/0070495 A1 3/2008 Stricklen et al.
2008/0114709 A1 5/2008 Dixon et al.
2008/0167920 A1 7/2008 Schmidt et al.
2008/0222734 A1 9/2008 Redlich et al.
2008/0244715 A1 10/2008 Pedone
2008/0254419 A1 10/2008 Cohen
2008/0288330 A1 11/2008 Hildebrand et al.
2009/0144308 A1 6/2009 Huie et al.
2009/0158430 A1 6/2009 Borders
2009/0319906 A1 12/2009 White et al.
2009/0320137 A1 12/2009 White et al.
2010/0010968 A1 1/2010 Redlich et al.
2010/0028846 A1 2/2010 Cohen et al.
2010/0146615 A1 6/2010 Locasto et al.
2010/0192201 A1 7/2010 Shimoni et al.
2010/0235918 A1 9/2010 Mizrahi et al.
2011/0167011 A1 7/2011 Paltenghe et al.
2011/0238855 A1 9/2011 Korsunsky et al.
2012/0124671 A1 5/2012 Fritzson et al.
2012/0258437 A1 10/2012 Sadeh-Koniecpol et al.
2013/0198846 A1 8/2013 Chapman
2013/0203023 A1 8/2013 Sadeh-Koniecpol et al.
2013/0232576 A1 9/2013 Kamikis et al.
2014/0115706 A1 4/2014 Silva et al.
2014/0157405 A1 6/2014 Joll et al.
2014/0165207 A1 6/2014 Engel et al.
2014/0173739 A1 * 6/2014 Ahuja .................. G06F 21/568 726/25
2014/0199663 A1 7/2014 Sadeh-Koniecpol et al.
2014/0199664 A1 7/2014 Sadeh-Koniecpol et al.
2014/0201836 A1 7/2014 Amsler
2014/0230060 A1 8/2014 Higbee et al.

(56) References Cited

U.S. PATENT DOCUMENTS

2014/0230061 A1 8/2014 Higbee et al.
2015/0287336 A1* 10/2015 Scheeres .................. G09B 5/02
434/156

OTHER PUBLICATIONS

Kumaraguru et al., "Protecting People from Phishing: The Design and Evaluation of an Embedded Training Email System," 2007, In Proceedings of the SIGCHI Conference on Human Factors in Computing Systems.
Kumaraguru et al., "Testing PhishGuru in the Real World," In Proceedings of the 2008 Symposium on Usable Privacy and Security (SOUPS 2008).
Kumaraguru, et al., "Lessons from a Real World Evaluation of Anti-Phishing Training," 2008 Anti-Phishing Working Group e-Crime Researchers Summit.
Sheng, et al., "Anti-Phishing Phil: The Design and Evaluation of a Game That Teaches People Not to Fall for Phish", Symposium on Usable Privacy and Security (SOUPS) 2007, Jul. 18-20, 2007, Pittsburgh, PA, USA.
Anderson et al., "A Development System for Model-Tracing Tutors," Nov. 18, 2008, Department of Psychology, Paper 78, Carnegie Mellon University Research Showcase.
Jagaric et al., "Social Phishing" ACM (Dec. 12, 2005).
Scheeres, Thesis: "Establishing the Human Firewall: Reducing an Individual's Vulnerability to Social Engineering," presented to Air Force Institute of Technology, Mar. 2008.
Vishwanath et al., "Why Do People Get Phished? Testing Individual Differences in Phishing Vulnerability with an Integrated, Information Processing Model." Mar. 3, 2011.
Ferguson, "Fostering E-Mail Security Awareness: The West Point Caronnade," published in Educause Quarterly Nov. 1, 2005.
Wombat Security Technologies, Inc. "An Empirical Evaluation of Phishguru™ Embedded Training", Apr. 2009.
Mitrovic, et al., "Evaluation of a Constraint-Based Tutor for a Database Language", International Journal of Artificial ntelligence in Education (1999), 10, p. 238-256.
Fette et al., "Learning to Detect Phishing Emails," World Wide Web Conference Committee, May 8-12, 2007, Banff, Alberta, Canada.
Mar. 19, 2020 U.S. Non-Final Office Action—U.S. Appl. No. 15/810,302.
Mar. 25, 2020 U.S. Notice of Allowance and Fees Due—U.S. Appl. No. 15/492,396.
Jun. 16, 2015 (WO) International Search Report and Written Opinion—App. PCT/2015/15860.
NIST, Risk Management Framework (RMF) Overview, [online], [Retrieved on Aug. 5, 2015], published Apr. 3, 2013, Retrieved from the internet, http://web.archive.org/web/20130304154402/http://csrc.nist.gov/groups/SMAffisma/ <http://csrc.nist.gov/groups/SM Affisma/> ramwork.html, entire document, especially p. 1 and p. 2.
The web page: http://threatsim.com/how-it-works, as published Jan. 15, 2012.
"How PhishMe Works", captured from web.archive.org based on page at http://www.phishme.com/, published Dec. 4, 2011.
Wombat Security Iechnologies, Inc., "Leading Computer Science University Takes Multi-Pronged Approach to Combat Phishing; Deploys Wombat Security's Highly Effective Suite of Training and Filtering Products" dated Mar. 10, 2011, available at: https://www.wombatsecurity.com/press-releases/leading-computer-science-Imiversity-takes-multi-pronged-approach-combat-phishing.
Wombat Security Technologies, Inc., "Case Study: Carnegie Mellon University—A Multi-Pronged Approach to Combat Phishing" dated Mar. 2011.
Wombat Security Technologies, Inc., "PhishGuru Phishing Attack Simulation Service" dated May 2012.
Wombat Security Technologies, Inc., "PhishGuru: Operations Manual" dated Aug. 30, 2010.
Wombat Security Technologies, Inc., "PhishPatrol—A Purpose-built Filter to Catch Those Crafty Spear Phishing Emails That Make It Past Other Email Security" dated Apr. 2012.
Wombat Security Technologies, Inc., "PhishPatrol™ SpamAssassin Plugin Operations Manual" dated May 2011.
Wombat Security Technologies, Inc., "Anti-Phishing Phyllis™ Training Game, Teaches Employees How to Identify Traps in Emails" dated 2011.
Wombat Security Technologies, Inc., "Anti-Phishing Phyllis™ Instructions" dated 2010.
Daft Hack, "How to Spear Phish Your Employees" Parts 1-3, posts by Daft Hack, Feb. 3 and 7, 2014 (15 pages).
Burns, M.B. et al., "What Kind of Interventions Can Help Users from Falling for Phishing Attempts: A Research Proposal for Examining Stage-Appropriate Interventions" 46th Hawaii International Conference on System Sciences HICSS), IEEE, Jan. 7-10, 2013, pp. 4023-4032.
Jansson, K. et al., "Simulating Malicious Emails to Educate End Users on-Demand" 3rd Symposium on Web Society (SWS), IEEE, Oct. 26-28, 2011, pp. 74-80.
Wombat Security Technologies, Inc., "PhishGuru Best Practices" 2012.
Sep. 24, 2020 U.S. Final Office Action—U.S. Appl. No. 15/810,302.
Feb. 19, 2021 U.S. Non-Final Office Action—U.S. Appl. No. 15/810,302.
Jul. 2, 2021 U.S. Notice of Allowance and Fees Due—U.S. Appl. No. 15/810,302.

* cited by examiner

400

| | 408 | 410 | 412 | 414 | 416 | 418 | 420 | |
|---|---|---|---|---|---|---|---|---|
| | Template ID | Template Title | Type | Sophistication Level | Fields | Campaign ID | Statistics | ... |
| 402 | Templ_1<br>422 | Mailbox is Full<br>424 | Email<br>426 | Medium<br>428 | From:<br>Email Address:<br>Subject:<br>Message: | CP_1<br>...<br>CP_M<br>432 | Stats_A<br>434 | ... |
| 404 | Templ_2 | Password Updated | Email | Medium | ...<br>430 | N/A | Stats_B | ... |
| | ... | ... | | ... | ... | ... | ... | ... |
| 406 | Templ_N | ... | Social Networking | High | ... | CP_5<br>...<br>CP_X | Stats_N | ... |

| Trust Tokens | Weight | --- |
| --- | --- | --- |
| First Name | 3 | ... |
| Last name | 3 | ... |
| Company | 4 | ... |
| Department/Group | 5 | ... |
| Date | 1 | ... |
| Time | 1 | ... |
| Email | 2 | ... |
| Graphics In Email | 2 | ... |
| High Sophistication Domain Name | 3 | ... |
| Medium Sophistication Domain Name | 2 | ... |
| Low Sophistication Domain Name | 1 | ... |
| Custom Sub-Domain | 3 | ... |
| Content Sophistication High | 3 | ... |
| Content Sophistication Medium | 2 | ... |
| Content Sophistication Low | 1 | ... |
| Staggered Delivery Time | 2 | ... |
| Random Delivery Order | 2 | ... |
| ... | ... | ... |
| Total | 40 | ... |

| | 808 | 810 | 812 | 814 | 816 | 818 | 820 | |
|---|---|---|---|---|---|---|---|---|
| | Client ID | Campaign ID | Address | Phone Number | Contact | Groups | Statistics | ... |
| 802 | Client_1<br>822 | Camp_A<br>Camp_B<br>824 | Address_A<br>826 | Phone_A<br>828 | Contact_A<br>830 | Finance<br>Marketing<br>Legal<br>Information Tech<br>832 | Camp_Stats_A | ... |
| 804 | Client_2 | Camp_A<br>Camp_C | Address_B | Phone_B | Contact_B | Group_A<br>...<br>Group_M | Camp_Stats_B<br>834 | ... |
| | ... | ... | | ... | ... | ... | ... | ... |
| 806 | Client_N | Camp_N | Address_N | Phone_N | Contact_N | Group_A<br>...<br>GroupN | Camp_Stats_N | ... |

| 908 | 910 | 912 | 914 | 916 | 918 | 920 | 921 | |
|---|---|---|---|---|---|---|---|---|
| Emp_1 922 | Client ID | Messaging Address | Campaign | Message | Action | System Attributes | Score | ... |
| Manager 923 | Client_1 924 | Msg_ Addr_A 926 | Camp_A 928 | M_1A 930 | Read Selected Hyperlink 932 | Browser_A Plugin_1 .... 934 | Score_A 936 | ... |
| Information Technology 925 | | | Camp_A | M_NA | Read Opened Attachment | Browser_A Plugin_1 | Score_B | ... |
| | | | Camp_B | M_1B | Read Notified Admin | ... | ... | ... |
| | | | ... | ... | ... | ... | ... | ... |
| | | | Camp_B | M_NB | Did Not Read | Mesage_Client_A Plugin_2 | Score_C | ... |

| | 1008 | 1010 | 1012 | 1014 | 1016 | 1018 | 1020 | | 1021 |
|---|---|---|---|---|---|---|---|---|---|
| | Campaign ID | Campaign Title | Template IDs | Client | Recipients | Scheduling Parameters | Rules | ... | Statistics |
| 1002 | CP_1 1022 | CP_ NAME_A 1024 | Temp_1 ... Templ_M 1026 | Client_1 1028 | Finance Inf.Tech. ... Emp.A@Domain Emp_1 1013 | Params_A 1032 | Rule_1 Rule_N 1034 | ... | Stats_A 1036 |
| 1004 | CP_2 | CP_ NAME_B | Templ_3 | Client_2 | ... | Params_A | N/A | ... | Stats_B |
| | ... | ... | ... | ... | ... | ... | ... | ... | ... |
| 1006 | CP_N | CP_ NAME_N | Templ_N ... Templ_Z | Client_N | ... | Params_N | N/A | ... | Stats_N |

FIG. 10

The email message that you opened contained two security-based threats, a hyperlink and an attachment. When presented with an email, care should be taken when selecting any of these types of items. Most legitimate email messages of this type will include your first name and last name and not just your first name.

In addition, you can "right" click on the hyperlink to view the URL associated therewith. If this URL looks suspicious do not select they hyperlink Once you detect a security-threat-based email please notify you IT department.

...

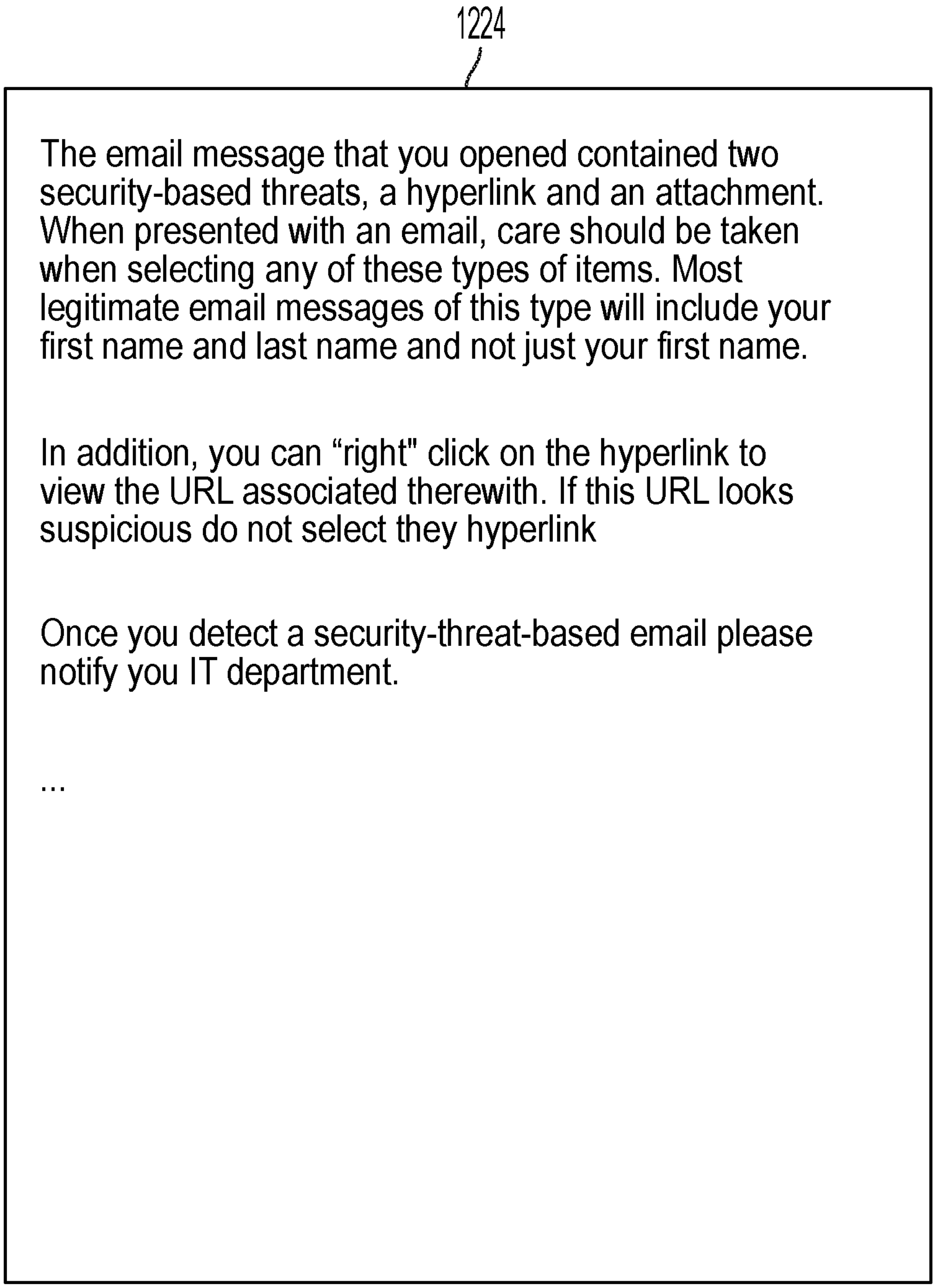

FIG. 12

| Technical Details | Points | ... |
|---|---|---|
| 1 Vulnerable Plugin in 1 campaign | 1 | ... |
| 1 Vulnerable Plugins in 2 campaigns | 2 | ... |
| 1 Vulnerable Plugins in 3 campaigns | 3 | ... |
| 1 Vulnerable Plugins in 4 campaigns | 4 | ... |
| 1 Vulnerable Plugins in 5 campaigns | 5 | ... |
| 2 Vulnerable Plugins in 1 campaign | 6 | ... |
| 2 Vulnerable Plugins in 2 campaigns | 7 | ... |
| 2 Vulnerable Plugins in 3 campaigns | 8 | ... |
| 2 Vulnerable Plugins in 4 campaigns | 9 | ... |
| 2 Vulnerable Plugins in 25 campaigns | | ... |
| ... | ... | ... |
| 3 Vulnerable Plugins in 5 campaigns | 15 | ... |
| 4 Vulnerable Plugin in 1 campaign | 16 | ... |
| 4 Vulnerable Plugin in 2 campaigns | 17 | ... |
| 4 Vulnerable Plugin in 3 campaigns | 18 | ... |
| 4 Vulnerable Plugin in 2 campaigns | 19 | ... |
| 4 Vulnerable Plugins in 5 campaigns | 20 | ... |
| 5 Vulnerable Plugins in 1 campaign | 21 | ... |
| 5 Vulnerable Plugins in 2 campaigns | 22 | ... |
| 5 Vulnerable Plugins in 3 campaigns | 23 | ... |
| 5 Vulnerable Plugins in 4 campaigns | 24 | ... |
| 5 Vulnerable Plugins in 5 campaigns | 25 | ... |
| ... | ... | ... |

FIG. 13

| User | Points | ... |
|---|---|---|
| Opened Email | 1 | ... |
| Clicked on current campaign | 6 | ... |
| Clicked on previous 2 campaigns | 10 | ... |
| Clicked on previous 3 campaigns | 15 | ... |
| Clicked on previous N campaigns | 25 | ... |
| Compromised on current campaign | 10 | ... |
| Compromised in last 2 campaigns | 20 | ... |
| Compromised in last N campaigns | 50 | ... |
| Opened attachment on current campaign | 10 | ... |
| Opened attachment in last 2 campaign | 20 | ... |
| Opened attachment in last N campaign | 50 | ... |
| ... | ... | ... |
| Multi-click | 1 | ... |
| Click from two different devices | 2 | ... |
| Click from unsupported or outdated browser | 3 | ... |
| Unsupported or outdated OS | 5 | ... |
| OOOO | 3 | ... |
| Reply | 5 | ... |
| Trained Current Campaign | -20% | ... |
| Reported | -30% | ... |
| Clicked on High Sophistication Email | x1 | ... |
| Clicked on Med Sophistication Email | x2 | ... |
| Clicked on Low Sophistication Email | x3 | ... |
| User Criticality User High | x3 | ... |
| User Criticality User Medium | x2 | ... |
| User Criticality User Low | x1 | ... |
| ... | ... | ... |

FIG. 14

| Short Sensor Description | Possible Implementation |
|---|---|
| Dangerous program sensor | Based on signatures of programs known to be dangerous |
| Attachment sensor | Looking at saved attachment directory |
| Configuration sensor | Detects specific OS, browser and email client on a given machine to possibly tailor relevant training |
| WiFi roaming sensor | Keep strack of WiFi access points user attaches to & determines whether they are off/on corporate network |
| Locator | Analyzes IP address or collect WiFi or even GPS locations(depending on client) |
| Phishing website sensor | Determines if user frequently visits sites that have been blacklisted/recently taken down |
| Password change sensor | Detects when users are due to change their passwords {e.g. based on corporate policy or based on some heuristic) |
| USB Device sensor | Raises an event when a USB drive is connected |
| Social networking sensor | Senses amount of time spent on socal networking sites |
| Social data sensor | Scans social networks to see how much information an employee has posted |

FIG. 23

2020 2030 Sample Training Needs Model with Threshold Levels 2030 2020

| Threat Scenarios | Sensed User Action | Threshold Level | Training Needs |
|---|---|---|---|
| Download malware from malicious USB | Insert USB in computing device | More than once per month | Malware (High), Safe Browsing (Medium) |
| Download malicious app | Download fake malicious app by scanning a QR code | Once | Malware (High), Safe Browsing (Medium) |
| Connect to rogue wireless service | Connect to unsecured or out of office access point | More than once per week | Network security (High), Safe Browsing (Medium) |
| SMS mock attack | Call fake malicious phone number in mock SMS attack | Once | Messaging (High), Smart Phone Security (Medium) |
| Bluesnarfing | User carries bluetooth discoverable device | Once | Messaging (High), Smart Phone Security (High) |

FIG. 24

Sample Elements of Quantitative Training Needs Model Based on Risk Estimates

4000

2020 4010

| Threat Scenario | Cost Per Incident |
|---|---|
| Open a Malicious Attachment | $1,000 |
| Infect Computer with a Virus | $500 |
| Disclose Personal Information | $10,000 |
| Fall for Phishing Email | $4,500 |

FIG. 25A

| Threat Scenarios | Sensed User Action | Frequency Thresholds | 24 Hour Susceptibility (Untrained) | 1 Week Susceptibility (Untrained) | 24 Hour Risk (Untrained) | 1 Week Risk (Untrained) |
|---|---|---|---|---|---|---|
| Open a Malicious Attachment | *Request Blacklisted Website* | Less than once per month | 0.001 | 0.005 | $1.0 | $5.0 |
| | | More than once per month | 0.005 | 0.025 | $5.0 | $25.0 |
| | *Open Email Attachment* | Less than once | 0.001 | 0.005 | $1.0 | $5.0 |
| | | More than once | 0.004 | 0.02 | $4.0 | $20.0 |
| Disclose Personal Information | *Post on Social Networking Sites* | Less than twice per week | 0.00005 | 0.00035 | $0.5 | $3.5 |
| | | More than twice per week & less than 8 times per day | 0.0005 | 0.0035 | $5.0 | $35.0 |
| | | More than 8 times per day | 0.002 | 0.014 | $20.0 | $140.0 |
| Fall for Phishing Email | *Open Email Attachment* | Less than 5 times per day | 0.001 | 0.005 | $4.5 | $22.5 |
| | | More than 5 times per day | 0.004 | 0.02 | $18.0 | $90.0 |
| | *Request Blacklisted Website* | Less than once per month | 0.002 | 0.01 | $9.0 | $45.0 |
| | | More than once per month | 0.007 | 0.035 | $31.5 | $157.5 |
| | *Read Email from Smart Phone* | Yes | 0.003 | 0.021 | $13.5 | $94.5 |

ASSESSING SECURITY RISKS OF USERS IN A COMPUTING NETWORK

CROSS REFERENCE TO RELATED APPLICATIONS

This application claims priority to and is a continuation of U.S. patent application Ser. No. 15/492,396, which claims priority as a continuation-in-part to U.S. patent application Ser. No. 14/620,866, filed on Feb. 12, 2015, which in turn claims priority to U.S. Provisional Patent Application No. 61/939,450, filed on Feb. 13, 2014.

In addition, U.S. patent application Ser. No. 15/492,396 (to which priority is claimed and of which this application is a continuation) is also a continuation-in-part of U.S. patent application Ser. No. 15/418,867, filed Jan. 30, 2017, which is a continuation of U.S. patent application Ser. No. 14/216,002, filed Mar. 17, 2014 ("the '002 Application'). The '002 Application claims priority to U.S. Provisional Patent Application No. 61/793,011, filed Mar. 15, 2013, titled Context-Aware Training Systems, Apparatuses and Methods. The '002 Application also claims priority to, and is a continuation-in-part of U.S. patent application Ser. No. 13/442,587, filed Apr. 9, 2012, entitled Context-Aware Training Systems, Apparatuses and Methods ("the '587 Application"), which in turn claims priority to: (i) U.S. Provisional Patent Application No. 61/473,384, filed Apr. 8, 2011 and entitled Behavior Sensitive Training System; and (ii) U.S. Provisional Patent Application No. 61/473,366, filed Apr. 8, 2011 and entitled System and Method for Teaching the Recognition of Fraudulent Messages by Identifying Traps Within the Message. The '002 Application also claims priority to, and is a continuation-in-part of, U.S. patent application Ser. No. 13/832,070, filed Mar. 15, 2013, which is a continuation of the '587 Application and the provisional applications described above.

The contents of the priority applications listed above are fully incorporated into this document by reference.

BACKGROUND

The present disclosure generally relates to managing security risks in computing networks, and more particularly relates to assessing security risks of users in a computing network. These security risks may be assessed based on a behavioral and/or technical profile of a user.

Security risks may include, for example, end user properties such as insecure passwords and/or usernames and/or end user activities, such as interacting with a phishing attack, disclosing sensitive information, using insecure network connections (e.g., public WiFi), improperly securing a mobile device, and/or the like. Security risks such as these may pose a significant risk to an employer, especially when an end user employee fails to recognize a security risk. Current security risk assessment systems and methods assess security risks after risky behavior has occurred (e.g., after a security risk presents itself). Current security risk assessment systems and methods are not preventative and forward-thinking.

These and other drawbacks exist.

SUMMARY

Various example embodiments include systems and methods for assessing security risks of users in computing networks. Additionally, a system and method in accordance with example embodiments may generate an interaction item for training or security, and it may send the interaction item to a user of an end user electronic device. The system may then obtain a set of sensed data relating to the user's interacting with an interaction item, as well as technical data relating to the device. The system will compare the sensed data to a set of security risk scoring metrics. The risk scoring metrics may include risk scoring metrics unique to each type of input data. For example, the risk scoring metrics may include a set of metrics each assigning a weight to a user action defined for a computing network-based security item, a set of metrics each assigning a weight to a different user action defined for a training item, and/or a third set of metrics each assigning weight to a different technical attribute of the technical data. An example system and method may include hardware and/or software components to calculate a security risk score for a user based on a comparison of input data to security risk scoring metrics. An example system and method may include hardware and/or software components to transmit and/or display a calculated security risk score.

An example system includes a database that stores input data and/or risk scoring metrics, one or more computer processors that accesses the input data and/or risk scoring metrics, a collection module that collects the retrieved transaction data, and an association module that associates the retrieved transaction data with existing data in one or more electronic databases.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIG. 4 depicts examples of security item and/or training item template profiles according to an embodiment of the disclosure.

FIG. 6 depicts an example set of sophistication metrics according to an embodiment of the disclosure.

FIG. 8 depicts example client profiles according to an embodiment of the disclosure.

FIG. 9 depicts an example user profile according to an embodiment of the disclosure.

FIG. 10 depicts campaign profiles according to an embodiment of the disclosure.

FIG. 12 depicts an example training item displayed before, during, and/or after interaction with a security item and/or training item according to an embodiment of the disclosure.

FIG. 13 depicts example risk scoring metrics according to an embodiment of the disclosure.

FIG. 14 depicts example risk scoring metrics according to an embodiment of the disclosure.

FIG. 23 illustrates an example set of sensors that may be used in the embodiments described in this document.

FIG. 24 illustrates an embodiment of a partial training needs model based on simple threshold levels.

FIG. 25A and FIG. 25 B illustrate elements of another embodiment of a training needs model.

DETAILED DESCRIPTION

According to an example embodiment, a risk assessment system and method may be provided, where the system and method may use multiple dimensions to assess and/or quantify the security risk of an entity (e.g., employees, departments, and a company as a whole) with respect to a computing network(s). This multi-dimensional risk assessment system may allow an organization to better detect and understand the security risks presented by its employees and/or various groups within the organization.

According to an example embodiment, a risk assessment system and method may include performing an initial risk assessment by transmitting a security item and/or a training item from a security system to a user system to obtain response data associated with the transmitted security item and/or training item. Response data may be used to calculate an initial risk score associated with a specific user. Subsequent security item and/or training item may be transmitted to a user system, where the subsequent security item and/or training item is determined based on the risk score associated with a user. Interactions via a user system with subsequent security items and/or training items may result in subsequent response data that may be transmitted to security system where a user's risk score may be updated and/or recalculated based on the subsequent response data.

According to an example embodiment, a security item and/or training item may include, for example, data associated with introductory security information, phishing information, social media information, remote and/or travel-related information, password information, social engineering information, web safety information, data protection information, email security information, computer security information, physical security information, simulation data associated with any of the preceding information, and/or any combination of the above or the like.

According to an example embodiment, a system may include a security system, a user system, and a network connecting a security system and a user system.

Risk Assessment System

Figure 1:
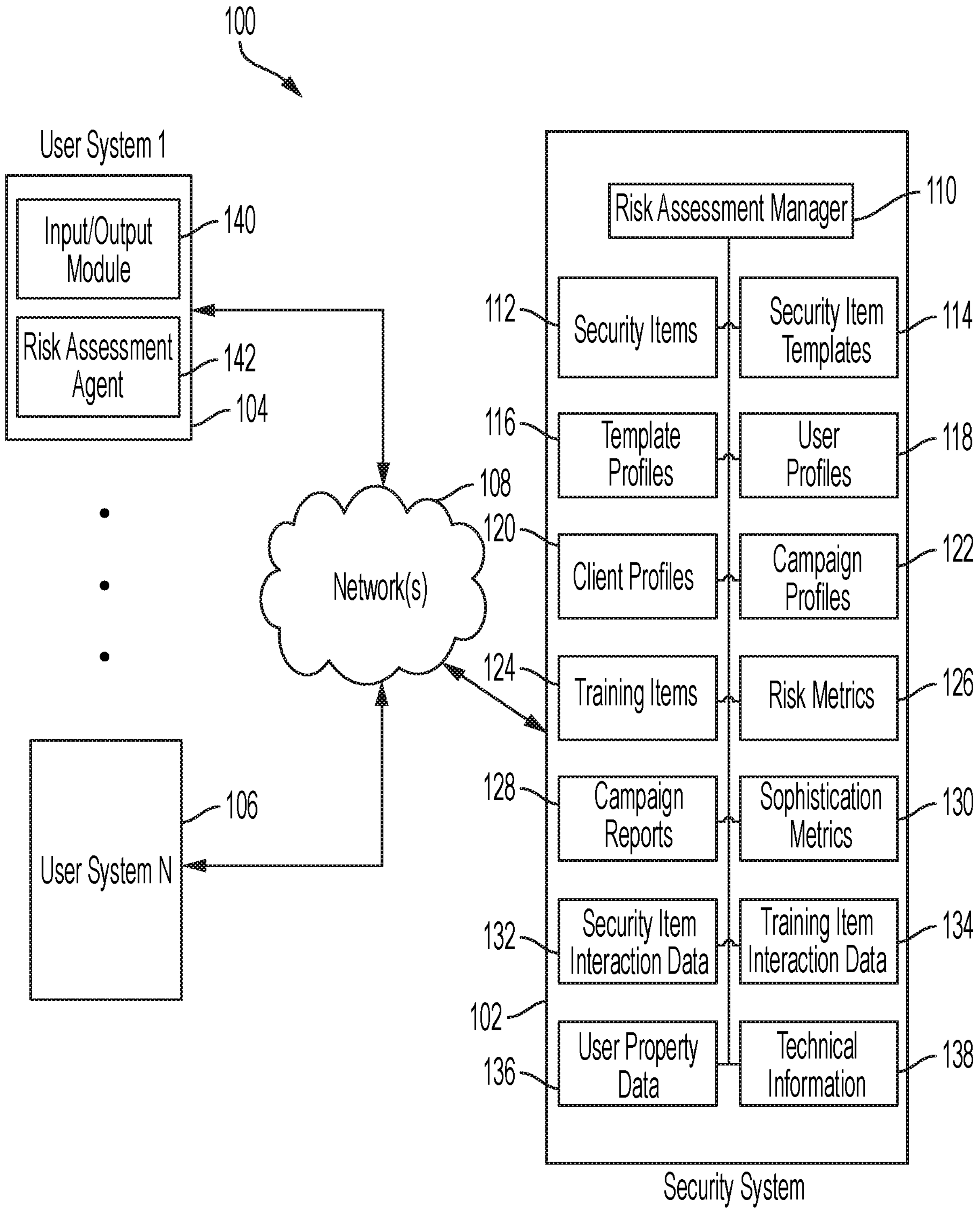
FIG. 1 depicts an example embodiment of a system for risk assessment according to an embodiment of the disclosure.

FIG. 1 illustrates a system 100 according to an example embodiment. The system 100 may include a user system 104, 106 and a security system 102 connected over a network 108.

The network 108 may be one or more of a wireless network, a wired network, or any combination of a wireless network and a wired network. For example, network 108 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 108 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 108 may further include one network, or any number of example types of networks mentioned above, operating as a stand-alone network or in cooperation with each other. Network 108 may utilize one or more protocols of one or more network elements to which they are communicatively couples. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

An end user may access network 108 through one or user systems 104, 106 that may be communicatively coupled to the network 108. A security user may access the network 108 through one or more security systems 102 that may be communicatively coupled to the network 108. Although pictured as two user systems 104, 106, the system 100 may include a number of user systems 104. For example, each user associated with an entity (e.g., company, group within a company, and/or the like) may be assigned a user system 104. Additionally, although security system 102 is depicted as a single systems and/or devices, it should be appreciated that according to one or more embodiments, security system may include a plurality of systems and/or devices. Security system 102 may resides within the same network as the user systems 104, 106, in a remote system outside of the network comprising the user systems 104, 106, and/or within a cloud computing environment.

An example user system 104, 106 and/or security system 102 may include one or more network-enabled computers to process instructions for assessing risk associated with an end user, with a group of end users, and/or with a company as described herein. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. A mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. The one or more network-enabled computers of the example system 100 may execute one or more software applications to perform risk assessment and/or analysis for an end user, a group of end users, and/or a company as described herein.

The user system 104, 106 and/or security system 102 may further include, for example, a processor, which may be several processors, a single processor, or a single device having multiple processors. The user system 104, 106 and/or security system 102 may access and be communicatively coupled to the network 108. The user system 104, 106 and/or security system 102 may store information in various electronic storage media, such as, for example, a database (not shown). Electronic information may be stored in the user system 104, 106 and/or security system 102 in a format such as, for example, a flat file, an indexed file, a hierarchical database, a post-relational database, a relational database, such as a database created and maintained with software from, for example Oracle® Corporation, Microsoft® Excel file, Microsoft® Access file, or any other storage mechanism.

The user system 102, 104 and/or security system 102 may send and receive data using one or more protocols. For example, data may be transmitted and received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiples Access (CDMA) based systems suitable for transmitting and receiving data. Data may be transmitted and received wirelessly or may utilize cabled network connections or telecom connections, fiber connections, traditional phone wireline connection, a cable connection, or other wired network connection.

Each user system, 104, 106 and/or security system 102 of FIG. 1 may also be equipped with physical media, such as, but not limited to, a compact disc (CD), a digital versatile disc (DVD), a floppy disk, a hard drive, read only memory (ROM), random access memory (RAM), as well as other physical media capable of storing software, or combinations thereof. User system, 104, 106 and/or security system 102 may be able to perform the functions associated with risk assessment and analysis as described herein and may, for example, house the software for risk assessment and analysis, obviating the need for a separate device on the network 108 to run the methods housed on the user system 104, 106 and/or security system 102. Furthermore, the information stored in a database (not shown) may be available over the network 108, with the network containing data storage.

A database housed on any user system 104, 106 and/or security system 102 or the network 108, may store, or may connect to external data warehouses that stores, risk score data, input data, scoring metrics, campaign data, template data, and/or other data used as described herein. Risk score data may include, for example, risk scores associated with an end user, with a group of end users, and/or a company.

Input data may include, for example, user property data, security item interaction data, training interaction data, and/or technical information associated with a particular user. User property data may include, for example, existing data associated with an end user of user system 104, 106, such as a username, a password, a security question, a security answer, a password hint, and/or the like. Security interaction data may include, for example, an action performed by a user with respect to a security item presented to the user at user system 104, 106. Training interaction data may include, for example, an action performed by a user with respect to a training-based item presented to the user at user system 104, 106. Technical information may include, for example, a device make, a device model, software stored on the device (e.g., software name, version, developer name, and/or the like), a network address associated with the device, and/or the like.

Input data may be used to calculate a security risk score of an end user, groups of end users, and an organization (e.g., company) associated with the user(s). Scoring metric data may include weights and/or scores assigned to data associated with a campaign, such as a security item, a training item, content associated with a security item and/or training item, responses associated with a security item, and/or training item, and/or the like. Template data may include data associated with a particular template that may be used to determine a risk score for an end user at user system 104, 106. For example, template data may include sender data, hyperlink data, questionnaire data, audio/video data, interactive application data, simulation data, training data, a sophistication level of a template item, and/or the like. Campaign data may include data associated with a risk assessment campaign such as template data used in a campaign, recipient data of a campaign, scoring metrics of a campaign, security items of a campaign, training items of a campaign, and/or the like.

The security system 102 may include hardware and/or software components to build a campaign, transmit campaign data to a user system 104, 106, receive behavioral and/or technical data associated with a campaign from a user system 104, and/or calculate a risk score for each end user, group of end users, and/or organization associated with an end user (e.g., company). Security system 102 may include a risk assessment manager 110 that transmits computing network-based security items and/or training items to end users at user systems 104, 106 to assess security risks posed by the end users to a computing network. Security items and/or training items may be presented to an end user at user system 104, 106 with a computing network-based security situation or scenario and/or with a training situation or scenario. Feedback and/or responses associated with presenting and/or transmitting security items and/or training items may include security item responses, training item responses, technical information, and/or user property data. Feedback and/or responses associated with presenting and/or transmitting security items and/or training items may be used to determine a risk score for a user.

Examples of security items 112 and/or training items 124 may include messages comprising security threats such as phishing messages (e.g., phishing emails, text/SMS/MMS messages, voice messages, instant messages, social network messages, and/or the like), password generation and/or update requests, questionnaires comprising different security-related scenarios such as handling computing devices outside of a work environment, social media interaction, mobile security interaction, social engineering topics, web safety, data protection, email security, computer security, and/or physical security, password generation, and/or the like. The risk assessment manager 110 may transmit a security item 112 and/or training item 124 to users based on their interactions with security items 112 and/or training items 124. The training items may instruct a user how to properly recognize security threats within security items; how to interact with security items in a way that does not comprise the security of the computing network; and/or the like. Examples of security item training items may include videos, websites, applications on how to recognize and interact with specific security threats (e.g., phishing messages, malicious attachments, etc.) and/or security-sensitive situations (e.g., password generation, utilization of company computing devices in external environments, handling sensitive data, etc.); interactive websites, applications, and/or the like asking prompting the user to provide answers to questions; and/or the like. Security items 112 and/or training items 124 may also include a simulation of a security item 112 and/or a training item 124.

The risk assessment manager 110 may receive end user behavioral data and/or technical data based on the transmitted security item and/or training item. The risk assessment manager 110 may use the received data and use the received data and/or other data stored within security system 102 to calculate a risk score for an end user associated with user system 104, 106, a group of end users, and/or an organization associated with the end user(s). The risk score may indicate how vulnerable an end user, groups of end users, the organization, and/or the computing network are to security risks.

Security system 102 also may include security items 112 (which may be simulated security items and/or actual security items). Security items 112 may be included in a template and campaign to be transmitted to user systems 104, 106. Security items 112 may present an end user associated with user system 104, 106 with a particular computing user and/or network-based security situation and may be used to assess a security risk of the end user with respect to the computing network. Security system 102 also may include training items 124 (which may be simulated and/or actual). Training items 124 may be included in a template and campaign to be transmitted to user systems 104, 106. Training items 124 may present an end user associated with user system 104, 106 with training data associated with user and/or network-based security scenarios. Training items 124 may include audio/video data, tests, quizzes, questionnaires, interactive applications, scenario-based challenge/response applications, and/or the like to obtain feedback from an end user using user system 104, 106 regarding knowledge and/or proficiency associate with user and/or network-based security issues. Feedback and/or responses to security items 112 and/or training items 124 may be received and stored as security item interaction data 132 and/or training item interaction data 134, respectively. Security item interaction data 132 and/or training item interaction data 134 may be used to generate an initial risk score for an end user, a group of end users, and/or an organization. Security item interaction data 132 and/or training item interaction data 134 may be used to update a risk score for an end user, a group of end users, and/or an organization. Security item interaction data 132 and/or training item interaction data 134 may be used to determine a sophistication level associated with subsequently transmitted security items 112 and/or training items 124 as well as the frequency of future occurrence for each end user based on the end user's score.

Security system 102 also may include security item templates 114, template profiles 116, user/employee profiles 118, client profiles 120, campaign profiles 122, risk metrics 126, campaign reports 128, sophistication metrics 130, user property data 136, and/or technical information 138. User systems 104, 106 may include an input/output module 140 and/or a risk assessment agent 142.

Input/output module 140 may include for example, I/O devices, which may be configured to provide input and/or output to user system 104, 106 (e.g., keyboard, mouse, display, speakers, printers, modems, network cards, etc.). Input/output module 140 also may include antennas, network interfaces that may provide or enable wireless and/or wire line digital and/or analog interface to one or more networks, such as network 108, over one or more network connections, a power source that provides an appropriate alternating current (AC) or direct current (DC) to power one or more components of user system 104, 106, and a bus that allows communication among the various components of user system 104, 106. Input/output module 140 may include a display, which may include for example output devices, such as a printer, display screen (e.g., monitor, television, and the like), speakers, projector, and the like. Although not shown, each user system 104, 106 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. Input/output module 140 may also include an application (e.g., a web browser, an email client, a text messaging application, a social networking application, etc.), an application programming interface, and/or or the like. An input/output module 140 may allow a the user of user system 104, 106 to receive and/or interact with security items 112 and/or training items 124 transmitted from the risk assessment manager 110 and/or send and receive messages from other users and applications, and/or the like.

The risk assessment agent 142 may monitor a user's interaction with security items 112 and/or training items 124 received from the risk assessment manager 110. Risk assessment agent 142 may identify attributes/characteristics of the user system 104, 106, such as user property data 136 and/or technical information 138. Risk assessment agent 142 may send feedback and/or responses to security items 112 and/or training items 124 to security system 102 where it may be stored as security item interaction data 132 and/or training item interaction data 134, respectively.

Security item interaction data 132 and/or training item interaction data 134 may also be stored within the user, template, and/or campaign profiles 114, 116, 122. Similarly, user property data 136 may be monitored at user system 104, 106, collected, and transmitted to security system 102 for storage and use in calculating a risk score. User property data 136 may include, for example, a username, an email address, a name, a group, an organization, a password, a security question, a security answer, a password hint, and/or the like. User property data 136 may include current and/or previous user property data. Technical information 138 may be monitored at user system 104, 106, collected, and transmitted to security system 102 for storage and use in calculating a risk score. Technical information 138 may be gathered based on information (e.g., a security item and/or a training item) transmitted to user system 104, 106. For example, a security item and/or a training item may include data indicative of vulnerable, hazardous, and/or unreliable content or the like. Accordingly, security system 102 may gather data relating to whether or not each data item in a security item and/or training item was properly transmitted to and/or loaded on a user system 104, 106. In this manner, various technical information may be determined. As another example, and agent on user system 104, 106 may gather and transmit technical information to security system 102. As another example, technical information 138 may be gathered using device to device communications. Technical information 138 may include, for example, a device make, a device model, software stored on the device (e.g., software name, version, developer name, and/or the like), operating system data (manufacturer, version, and/or the like), platform data, location data (e.g., geo-location data and/or the like), a network address associated with the device, and/or the like. Technical information 138 may include current and/or previous technical information. User property data 136 and/or technical information 138 may also be stored in within the user, template, and/or campaign profiles 114, 116, 122.

Risk Assessment Manager

Security system 102 may include hardware and/or software components such as a database, processor, and/or non-transitory computer readable media. Security system 102 may include a risk assessment manager 110 may transmit a security item 112 and/or training item 124 to user systems 104, 106. A security item 112 and/or training item 124 may include a computing network-based security situation, threat, environment, questionnaire, interactive application, audio/video files and/or the like. For example, a security item 112 and/or training item 124 may include security threats such as message-based security threats (e.g., voice, text, MMS, SMS, email, and/or instant message-type of security threats) or messages with simulated malicious attachments; a situation/scenario such as a password generation or update request; questionnaires presenting a security-related situation such as introductory security information, phishing information, social media information, remote and/or travel-related information, password security information, social engineering information, web safety information, data protection information, email security information, computer security information, physical security information, and/or simulation data associated with any of the preceding information; and/or the like.

Security items 112 and/or training item 124 may be simulated or actual (real) security items 112 and/or training item 124, respectively. Examples of security item 112 and/or training item 124 used throughout this discussion may include examples for illustrative purposes only. Embodiments of the present disclosure may be applicable to any computing network-based security item and/or training item.

Risk assessment manager 110 may allow entities, such as a company, to prepare and/or transmit security items 112 and/or training items 124 via messages, applications, web pages, and/or the like. Risk assessment manager 110 may transmit a security item 112 and/or training item 124 to an assigned user system 104, 106 associated with a particular user to facilitate security awareness training. If a user of user system 104, 106 interacts with security items 112 and/or training items 124 in a way that poses a security risk to an entity, a risk assessment manager 110 may transmit a training item 124 to the user system 104, 106, where the training item 124 is related to the initial security item 112 and/or training item 124. For example, if a security item 112 includes a message having a simulated security threat, such as a phishing link, and a user at user system 104, 106 selects/clicks the link a risk assessment manager may transmit a training item 124 to the user system 104, 106 in response to the selection, which may be viewed using input/output module 140. As another example, a security item 112 transmitted to user device 104, 106 may include a training item 124 to be displayed, played, and/or the like before, during, and/or after iteration with a security item 112 regardless of feedback associated with security item 112. As another example, a first training item 124, such as a questionnaire may include a second training item 124 to be displayed, played, and/or the like before, during, and/or after iteration with the first training item 124 regardless of feedback associated with the first training item 124. Together, feedback and/or responses to security items 112 and/or training items 124 (e.g., security item interaction data 132 and/or training item interaction data 134), user property data 136 and/or technical information 138 may be used by risk assessment manager 110 to calculate a risk score for a particular user, group of users, and/or organization.

Figure 2:
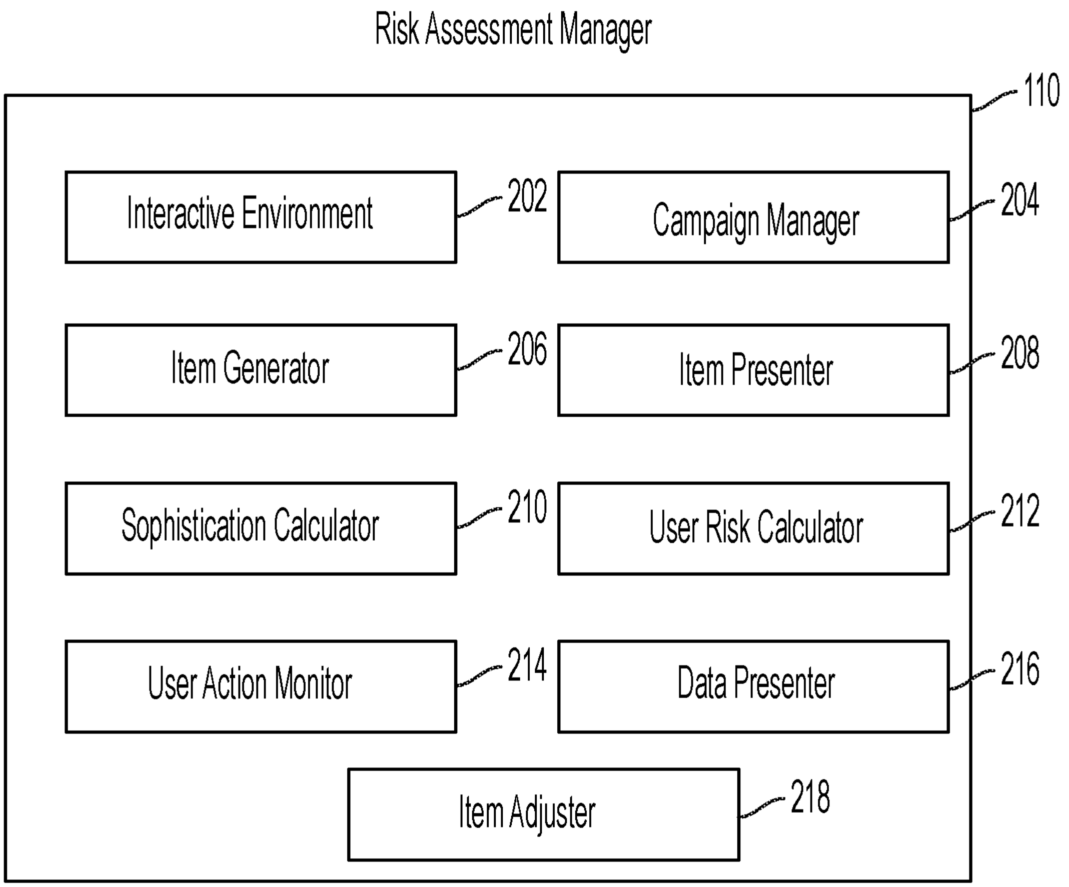
FIG. 2 depicts a block diagram of a risk assessment manager according to an embodiment of the disclosure.

As illustrated in FIG. 2, risk assessment manager 110 may include various hardware and/or software components such as an interactive environment 202, a campaign manager 204, an item generator 206, an item presenter 208, a sophistication calculator 210, a user risk calculator 212, a user action monitor 214, a data presenter 216, and an item adjuster 218.

Interactive environment 202 may include data and/or processors configured to generate an application and/or a website that allows a user of security system 102 to create a security item and/or training item campaign. Security item and/or training item campaigns may include security items 112 and/or training items 124, which may be transmitted and presented to users of user system 104, 106 over a given period of time as part of a campaign. Characteristics of security item 112 may be configured to require a user of user device 104, 106 to determine whether a security item 112 is trustworthy or was sent by a trustworthy source. Characteristics of training item 124 may be configured to require a user of user device 104, 106 to determine answers and/or responses to a training item 124.

For example, if a security item 112 is a simulated phishing message, a simulated social networking message, a simulated password generation message, and/or the like, the content of the message may be personalized to a user at user system 104, 106, have a spoofed sender address that portrays a legitimate sender, and/or includes other content that increases the likelihood (probability) that the user will perceive the message as being legitimate and/or trustworthy. As another example, characteristics of a training item 124 may be altered to include varying levels of difficulty (e.g., more or less difficult questionnaires) to determine a level of knowledge associated with a training item 124. Altering characteristics of a security item 112 and/or training item 124 may be based on a sophistication level associated with a security item 112 and/or training item 124.

Figure 3:
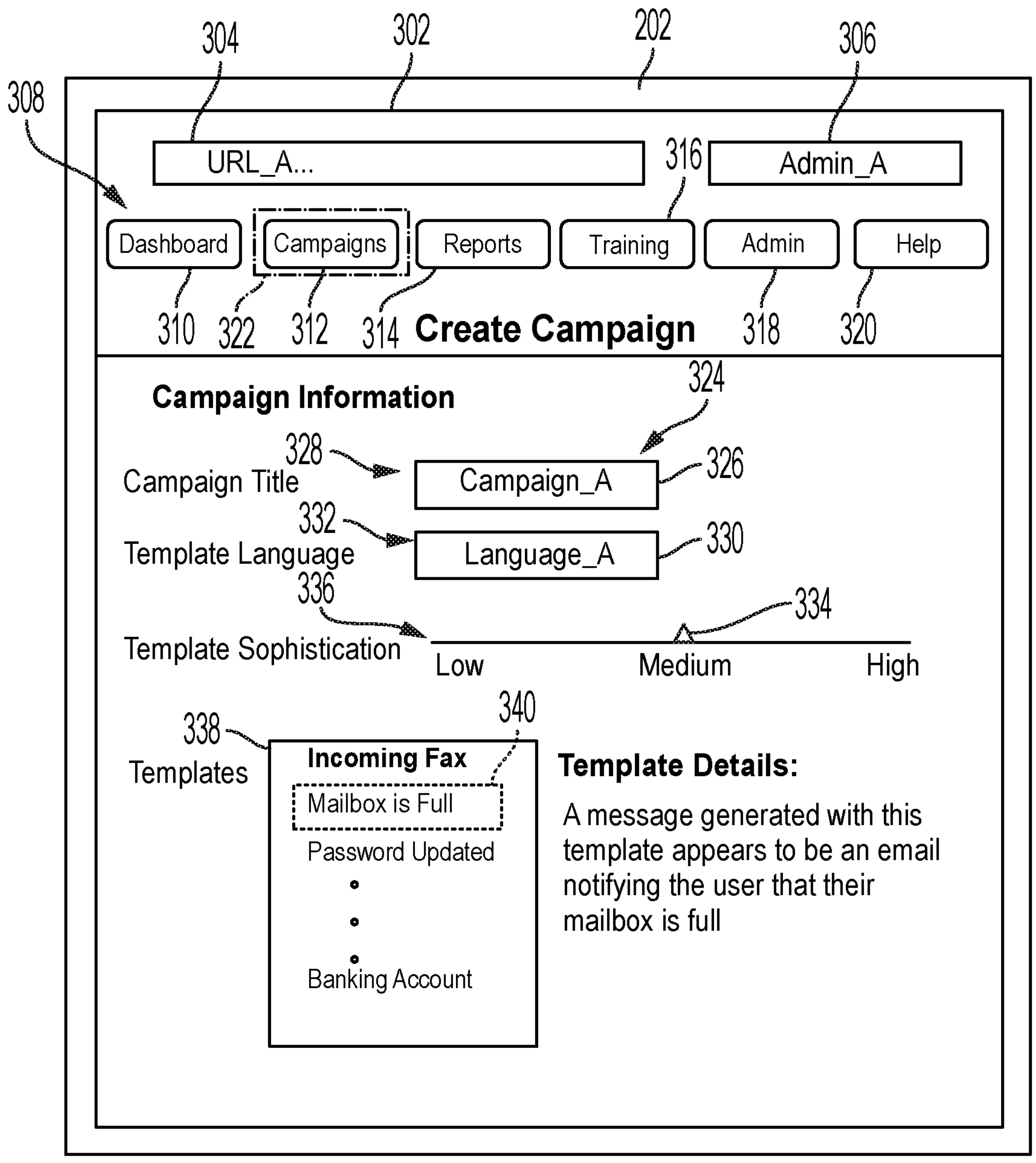
FIG. 3 depicts an example interactive environment for creating a campaign according to an embodiment of the disclosure.

FIG. 3 illustrates an interactive environment 202. Although FIGS. 3 through 16 may be indicative of a particular type of security item 112 and/or training item 124, each campaign may include a number of different security items 112 and/or training items 124, where each security item 112 and/or training item 124 may be based on a template specific to that security item 112 and/or training item.

According to FIG. 3 for example, interactive environment 202 may include windows 302 for generating a security item and/or training item campaign. A first portion 304 of the window 302 may identify a uniform resource locator (if any) of an interactive environment page being displayed in the window 302. A second portion 306 of the window 302 may display a user identifier (ID) of a user currently logged into the interactive environment 202. A third portion 308 of the window 302 may display selectable widgets 310, 312, 314, 316, 318, 320 (e.g., tabs, icons, menu items, etc.) each associated with one or more areas of the interactive environment 202. For example, FIG. 3 illustrates a "Dashboard" widget 310, a "Campaigns" widget 312, a "Reports" widget 314, a "Training" widget 316, an "Admin" widget 318, and a "Help" widget 320 have been displayed to the user. These windows, widgets, and/or features of the interactive environment are exemplary. These windows, widgets, and/or features may be altered depending on the type of campaign, template, security item and/or training item associated with the interactive environment 202.

The "Dashboard" widget 310 may link to and display data including summary information such as (but not limited to) a list of campaigns that have completed, a list of campaigns that are in progress, a list of campaigns that are scheduled for a future start date; performance data for one or more entities with respect to a given campaign and/or across multiple campaigns; performance data for one or more entities with respect to other entities for similar campaigns; and/or the like. Campaign similarity may be determined based on security item and/or training item sophistication scores, number of security items 112 and/or training items 124 presented to users of user device 104, 106, and/or the like.

The "Campaigns" widget 312 link to and display data associated with security item and/or training item campaigns that have been created. The "Campaigns" widget 312 may link to and display data displays options and information that allow the user of security system 102 to create/modify one or more campaigns. The "Reports" widget 314 may link to and display data such that a user of security system 102 is able to view one or more reports associated with an entity with respect to one or more campaigns. Examples of reports may include (but are not limited to) reports showing how an entity (e.g., an organization subscribing to the risk assessment manager 110) performed as a whole on one or more campaigns compared to other entities within the same and/or different industry; reports showing how individual groups within an entity performed on one or more campaigns; reports showing how individual users (e.g., employees) of an entity performed on one or more campaigns; and/or the like. Reports may be based on risk scores associated with each user, group, entity and/or combination of any of the above. Risk scores may be based on a number of data points gathered, including security item intimation data 132, training item interaction data 134, user property data 136, and/or technical information 138. Risk scores and reports may be generated for an individual user, a group of users, and/or an entity including a number of users (e.g., a company).

The "Training" widget 316 may link to and display data associated with training items 124 that may displayed to users of user system 104, 106 to educate the user on various security items 112 and/or training items 124. Training items 124 may be transmitted and displayed to a user of user system 104, 106 at any point in time, including before interaction, when a user has interacted with a security item in a way that that poses a security risk to the company, and/or after interaction. A "Training" widget may also allow a user of security system 102 to edit and/or create a training item 124 associated with a particular template.

The "Admin" widget 318 may link to and display administrative actions associated with risk assessment manager 110. Examples of administrative actions may include (but are not limited to) managing the users of security system 102 who have access to the risk assessment manager 110; managing the registration information for companies subscribing to the risk assessment manager 110; and/or the like. The "Help" widget 320 may link to and display help information regarding one or more aspects of the interactive environment 202.

FIG. 3 illustrates an example display of a "Campaigns" widget 312, as indicated by the dashed box 322. A "Campaign" widget 312 may change based on the type of campaign and the data required to build and/or execute a campaign. In this example, a campaign area 324 of the interactive environment 202 may be displayed within the window 302 (or as a new window). A user of security system 102 may interact with the campaign area 324 to create one or more campaigns. A user of security system 102 also may modify a previously created campaign via the campaign area 324. A campaign may include a security items 112 and/or training item 124 to be transmitted and displayed to a user system 104, 106 associated with a specified recipients over a given period of time. Security items 112 and/or training items 124 may be based on one or more templates 114 and/or may be custom security items 112 and/or training items 124. Templates 114 may include pre-defined fields, content, and/or formatting used by the risk assessment manager 110 to transmit security items 112 and/or training items 124 to a user system 104, 106 for display to a specified user.

A campaign may include a name/title 326 for the campaign being created (or modified) in a first portion 328 of the campaign area 324. A language 330 may be selected and/or entered for a campaign in a second portion 332 of the campaign area 324. A campaign also may include a selected sophistication/difficulty level 334 for a template from a third portion 336 of the campaign area 324. A sophistication level 334 of a template may indicates the degree of complexity (or difficulty) that the content of a template (and its generated security items) may have. The higher the sophistication level, the more difficult it may become for a user of user system 104, 106 to determine that a security item 112 generated from the template is untrustworthy and comprises one or more security-based threats and/or to determine responses and/or interaction associated with a training item 124.

A sophistication level may be determined based on a score and/or value associated with a particular template, security item 112, training item 124, and/or any other data associated with a campaign and/or template. For example, each security item 112, training item 124, field, and/or other data included in a template may have an associated value indicative of a level of difficulty associated with identifying a security risk. As an example of a value-based sophistication level, a scenario-based training item 124 relating to social media may have a sophistication level of 9 out of 10 or 90 out of 100, or the like when the training item 124 includes about ninety (90) percent recognizable and/or familiar fiends, data, and/or the like, such as a known social media provider, known user information such as a name, location, and/or picture, and/or known friend data, such as names, locations, and/or pictures. As another example of a value-based sophistication level, a scenario-based training item 124 relating to mobile security may have a sophistication level of 5 out of 10 or 50 out of 100, or the like when the training item includes fifty (50) percent recognizable and/or familiar fields, data, and/or the like such as a known mobile carrier, mobile number, associated email address, name, and/or the like. Although scores associated with percentages are used in this example, other methods for calculating a value associated with a sophistication level may exist such as adding up value associated with each field, data, and/or other item included in a template, security item, training item, and/or campaign. Each sophistication level (e.g., low, medium, high) may be associated with a range of values. For example, a low sophistication level may be associated with a range of 0-33, a medium sophistication level may be associated with 34-67, and a high sophistication level may be associated with 68-100.

A template 114 may be assigned a low sophistication level, and in response, security system 102 may generate an easier version of a security item 112 and/or training item 124 as opposed to a template 114 assigned a higher sophistication level. For example, a low sophistication selection in template 114 may generate a security item 112 and/or training item 124 with a message from a sender address that is from an obvious untrustworthy source and comprise content that is suspicious and/or less difficult. A high sophistication selection in template 114 may generate a security item 112 and/or training item 124 at security system 102 that includes a message with a spoofed sender address from a known or trustworthy source and include content that is more difficult. A sophistication level of a security item 112 and/or training item 124 may be altered by changing the amount of information within the security item 114 and/or training item 124 that guides the user of user system 104, 106 in reducing computing network-based security risks. For example, when a security item 112 and/or training item 124 includes a password generation request or a questionnaire on how to generate a security password, a higher sophistication level may include displaying less guidance on generating a secure password than a security item 112 and/or training item 124 with a lower sophistication level.

Once the user of security system 102 has entered template parameters (e.g., language, sophistication level, and/or the like), the campaign manager 204 may generate a template list 338 by searching and returning templates 114 matching the template parameters. Campaign manager 204 may dynamically generate a template list 338 as a user of security system 102 provides and/or changes template parameters. Campaign manager 204 may dynamically update the template list 338 based on information stored within each of the templates 114 and/or their template profiles 116.

FIG. 4 illustrates examples of template profiles 116. Each row 402, 404, 406 in the table 400 may correspond to a template profile. Each profile 402, 404, 406 may be stored separate from one another and/or in a combined manner. Template profiles may not be required and the profile information may simply be included within and/or attached to the actual templates 114. Template profiles may define the data included in a templates 114.

The table 400 may include a number of columns, each storing a different set of information. For example, the table 400 may include a first column 408 entitled "Template ID;" a second column 410 entitled "Template Title;" a third column 412 entitled "Type;" a fourth column 414 entitled "Difficulty Level;" a fifth column 416 entitled "Fields;" a sixth column 418 entitled "Campaign ID;" and/or a seventh column 420 entitled "Statistics." The "Record ID" column 408 may include entries 422 identifying a template associated with the template profile. The "Template Title" column 410 may include entries 424 with the title/name of an associated template.

The "Type" column 412 may include entries 426 identifying the security item type (if any) associated with a template. For example, a template profile may be associated with a template for generating an introductory security item 112 and/or training item 124, a phishing-related security item 112 and/or training item 124, a social media security item 112 and/or training item 124, a mobile security related security item 112 and/or training item 124, a remote and/or travel related security item 112 and/or training item 124, a password related security item 112 and/or training item 124, a social engineering related security item 112 and/or training item 124, a web safety related security item 112 and/or training item 124, a data protection related security item 112 and/or training item 124, an email security related security item 112 and/or training item 124, a computer security related security item 112 and/or training item 124, and/or a physical security related security item 112 and/or training item 124.

A "Difficulty Level" column 414 may include entries 428 identifying a sophistication level associated with a generated security item 112 and/or training item 124. As described, a sophistication level may alter, for example, the level of difficulty in determining that a security item 112 generated from the associated template comprises security threats, or the amount of guidance within a training item 124 for reducing security risks. A "Fields" column 416 may include entries 430 identifying fields of the template (e.g., a "From:" field, an "Email Address:" field, a "Subject:" field, and/or a "Message:" field). The "Campaign" column 418 may include entries 432 identifying the campaigns (if any) that the associated template is associated with.

The "Statistics" column 420 may include entries 434 with various types of statistical information associated with a template. For example, statistical entries may include information such as (but not limited to) the number of times security items 112 and/or training items 124 generated from a template were interacted with (e.g., opening a simulated phishing message, completing a training video and/or questionnaire) by a recipient at user system 104, 106; the number of times a simulation associated with a security item 112 and/or training item 124 generated from the template were interacted with by the recipient at user computer 104, 106, and/or the like.

As discussed above, the campaign manager 204 may dynamically update a template list 338 based on information stored within each of the templates 114 and/or the template profiles 116. In the example shown in FIG. 3, a user of security system 102 may selected a sophistication level, such as "high," "medium," or "low." Upon selection of a sophistication level, a campaign manager 204 may search template profiles 116 for templates having a matching sophistication level. The campaign manager 204 may identify and return these templates 114 in a template list 338 with at least the titles/names of the identified templates 114 obtained from the template profile 116.

Figure 5:
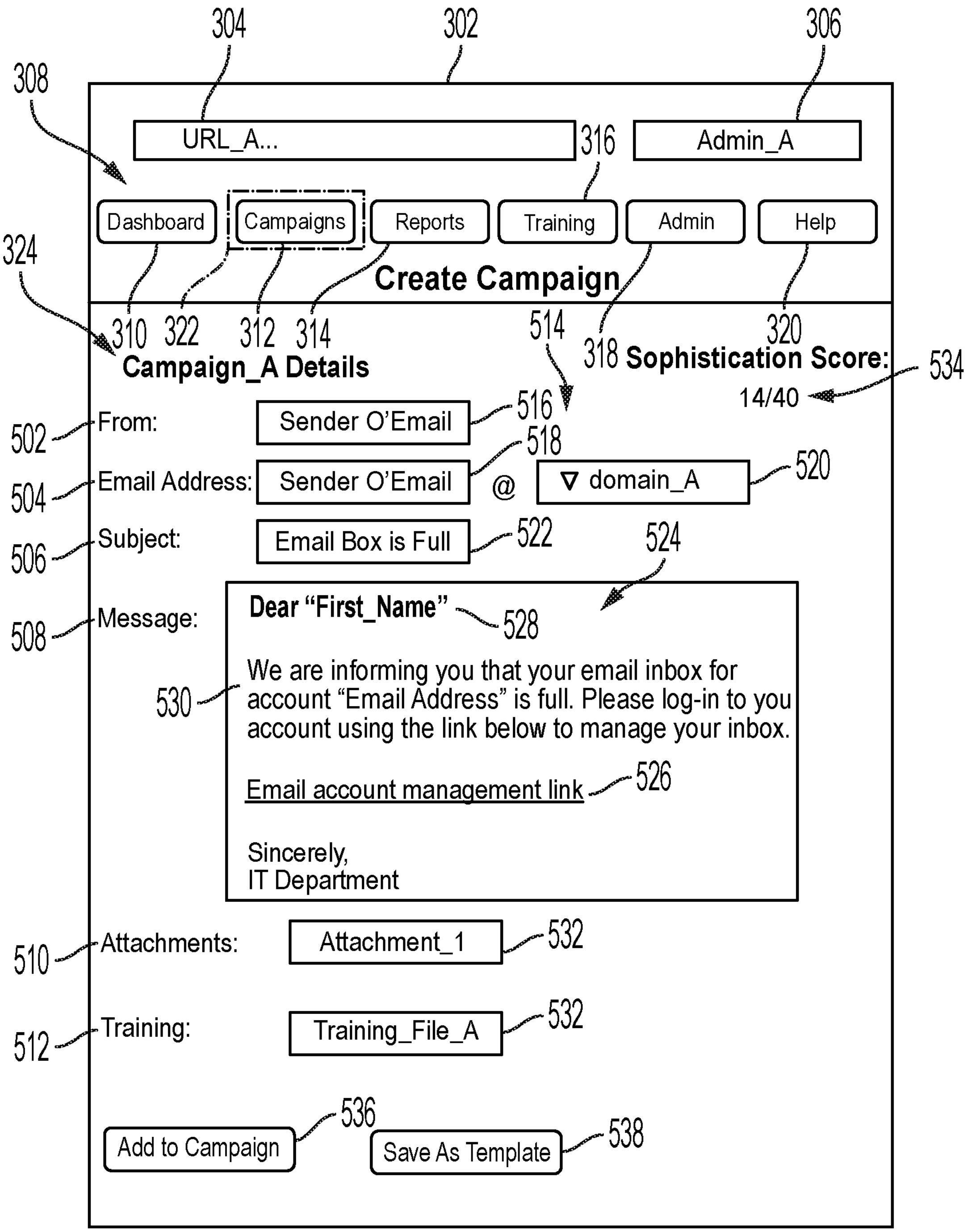
FIG. 5 depicts an example interactive environment presenting a template to a user according to an embodiment of the disclosure.

A security system 102 user may select a template 114 from the template list 338, as indicated by the dashed box 340. A campaign manager 204 may return and a selected template 514, within the interactive environment 202. For example, FIG. 5 illustrates a selected template 514 associated with a security item 112 that includes a message with a simulated security threat. The template 514 may be displayed within the campaign area 324, within a new window, and/or the like. A template 514, such as the example provided in FIG. 5, may include a number of fields. For example, in a template 514 based off of a security item 112 and/or training item 124 that includes a message, the template 514 may include a "From" field 502, a "Communication Address" field 504, a "Subject" field 506, a "Content" field 508, an "Attachments" field 510, and/or a "Training"

Field 512. These fields 502, 504, 506, 508, 510, 512 may be pre-populated with default values, data, and/or information stored within the template 514 itself and/or its template profile 116. A user of security system 102 may also enters and/or select values and/or data to be included in each field.

For example, FIG. 5 illustrates the "From" field 502 may receive data 516 such as a name. This name may be included in each security item 112 and/or training item 124 generated from the template, and may be displayed to a recipient user at user system 104, 106 as the sender of the security item 112 and/or training item 124. The "Communication Address" field 504 may receive data such as a user name 518 and a domain 520. This data 518, 520 may be added to each security item 112 and/or training item 124 generated from the template 514, and may be displayed to the recipient user at user system 104, 106 as an email address of the sender of the security item 112 and/or training item 124. The "Subject" field 506 may receive data 522 that may be added to each security item 112 and/or training item 124 generated from the template 514, and may be displayed to the recipient user at user system 104, 106 as the subject of the security item 112 and/or training item 124.

The "Content" field 508 may include data 524 such as characters, text, images, videos, audio, interactive applications, hyperlinks, and/or the like that are added to each security item 112 and/or training item 124 generated from the template 514, and displayed to the recipient user at user system 104, 106 as the body the security item 112 and/or training item 124. The "Content" field 508 may include one or more simulated security-based threats that are added to each security item 112 and/or training item 124 generated from the template 514.

For example, FIG. 5 illustrates a "Content" field 508 including a hyperlink 526, and two information fields 528, 530 denoted by the pair of asterisks symbols. The hyperlink 526 may include a simulated security-based threat that, when selected by a user of user system 104, 106, requests a training item 124 from risk assessment manager 110 to display training data to the user at user system 104, 106. A hyperlink 526 also may link to a webpage or an application page that requests a recipient on user device 104, 106 enter his/her email account user name, password, and/or other personal/secure information.

The information fields 528, 530 may be dynamically populated by the item generator 206 when generating a security item 112 and/or training item 124 from the template 514 based on the intended recipient at user system 104, 106. For example, the first information field 528 illustrated in FIG. 5 includes the recipient's first name added at that location within the security item 112 and/or training item 124. The second information field 530 may indicate that the recipient's email address is to be added at that location within the security item 112 and/or training item 124. Therefore, each security item 112 and/or training item 124 generated from this template 514 may be personalized to the recipient at user system 104, 106.

The "Attachments" field 510 may include a file identifier 532 for a file that is to be attached to the security item 112 and/or training item 124 (e.g., a file comprising simulated malicious software/scripts, phishing-based hyperlinks, interactive application, audio/video files, and/or the like). A user at user system 104, 106 may be presented with a list of files to select from. The file identifier 532 of a selected file may be displayed in the "Attachments" field 510.

The "Training" field 512 may include a training item identifier 534 for a training item 124 that is to be displayed to a user when he/she interacts with the security item 112 and/or training item 124. For example, a user at user system 104, 106 may receive a security item 112 with a simulated insecure file. When the user attempts to open the insecure file associated with the security item 112, risk assessment manager 110 may transmit a training item 124 associated with the security item 112. As another example, a user at user system 104, 106 may be presented with a training item 124 that includes an interactive application and/or questionnaire. Based on the interaction data and/or responses received from the user at user system 104, 106, a second training item 124 may be transmitted from the risk assessment manager 110 to user system 104, 106. The training item 124 (or second training item 124) may be identified by the risk assessment manager using identifier 534.

Data within each of the fields 502, 504, 506, 508, 510, 512 may be altered to provide the security item 112 and/or training item 124 generated from the template 514 with a given degree of sophistication (i.e., a sophistication level). For example, security item 112 and/or training item 124 may include a message related to actual and/or simulated security threats, the sophistication level of security item 112 and/or training item 124 may be altered based on the content of the message. In this example, altering a sophistication level may alter various content, such as sender data to entice a recipient at user system 104, 106 to trust the message, interact with one or more security items 112 and/or training items 124 within the message, and/or the like. A recipient at user device 104, 106 may be less likely to determine that a message includes a security-based threat if the message has a higher sophistication level as compared to a lower sophistication level. Altering a sophistication level of a security item 112 and/or training item 124 may change the amount of guidance provided within the security item 112 and/or training item 124 on how to reduce computing network-based security risks.

A security item 112 and/or training item 124 also may include a trust indicator. A trust indicator may include a personal trust indicator and/or a general trust indicator. A trust indicator may be generated for each security item 112, training item 124, and/or template. A trust indicator may include information specific to the user receiving a security item 112 and/or training item 124. For example, a trust indicator may include a name (e.g., user's name, company name, coworker's name, friend's name, and/or the like), picture, location, URL, company data, logo, trademark, and/or other recognizable data associated with a user and/or company. A trust indicator may also include a value associated with the trust indicator to indicate a sophistication level associated with the trust indicator.

A trust indicator may increase the sophistication level of a security item 112 and/or training item 124. A trust indicator may include specific content, a specific content type, and/or specific content attributes to increase a sophistication level of security item 112 and/or training item 124. The following examples of fields are not meant to be limiting and trust indicators may be provided for any field in any template for a security item 112 and/or training item 124. For example, an introductory security item 112 and/or training item 124 may include fields and/or data indicative of the sender of the introductory item, the recipient of the introductory item, and/or the like; a social media security item 112 and/or training item 124 may include a social media company name fields, friend fields, family fields, picture fields, content/postings fields, and/or the like; a mobile security item 112 and/or training item 124 may include fields relating to a mobile security company, recent mobile security risks, and/or the like; a remote or travel security item 112 and/or training item may include fields relating to travel agents, travel companies, hotels, modes of transportation, transit companies, confirmation numbers, and/or the like; password security items 112 and/or training items 124 may include fields associated with password clues, security questions, security answers, password requirements, and/or the like; safety, protection, and/or security-related security items 112 and/or training items 124 may include fields associated with protection companies, email providers, security companies, malware products, spyware products, antivirus products, and/or the like. Additional types of security items 112 and/or training items 124 and/or additional fields may be included as described herein.

By way of example, a "From" field 502 of the template 514 may include a trust indicator such as the name of someone familiar to a recipient, which may make the generated security item 112 and/or training item 124 more trustworthy to a recipient at user device 104, 106 and increases the likelihood that the recipient will interact with the security item 112 and/or training item 124. Field 502 may include an unfamiliar name the generated security item 112 and/or training item 124, decreasing the likelihood that the recipient at user system 104, 106 will interact with the security item 112 and/or training item 124. For example, a specific name, a name with an attribute of being familiar recipients, and/or the like may be a trust indicator.

An "Email Address" field 504 may include a trust indicator such as a username and/or domain or a finer grain trust indicator such as a username/domain with a given degree of sophistication, familiarity, sensibility, and/or the like. A "Subject" field 506 may include trust indicators such as a subject heading or a finer grain trust indicator such as a subject heading with a given degree of sophistication, familiarity, sensibility, and/or the like.

A "Content" field 508 may include trust indicators, such as trust indicators that personalize a generated message to the recipient at user system 104, 106. For example, a trust indicator within a "Content" field 508 may include the recipient first name, last name, first and last names, addresses, work identifier number, and/or any other information that is personal to the user at user system 104, 106. A trust token within the "Content" field 508 may include an information field (e.g., *First_Name, *Email_Address*, etc.) that may be dynamically populated by the item generator 206 with information personal to the recipient at user system 104, 106. In addition, a "Content" field 508 (and/or other fields such as a "Subject" field 506") may include trust indicators such as watermarks, images, text, and/or the like that indicate a level of sophistication associated with the content of the security item 112 and/or training item 124.

A sophistication calculator 210 may calculate and/or alter a calculated sophistication level for each template based on the content, the type of content, and attributes of the content within the template. For example, trust indicators may be assigned a weight or number points. A sophistication calculator 210 may calculate a sophistication level of a template (and/or a security item 112 and/or training item 124) as the sum of the weights or points assigned to the trust indicators within the template.

FIG. 6 illustrates a set of sophistication metrics 629 with various examples of trust indicators (e.g., specific template content, content types, and/or content attributes) along with an assigned weights or number of points. Sophistication metrics 629 of FIG. 6 are not limited to trust indicators. For example, these metrics may also include items that negatively affect the sophistication level of a template (and its messages) as well.

Template content items such as security item 112 and/or training item 124 content may be associated with a trust indicator resulting in a "high", "medium", or "low" sophistication level. For example, a domain name that is familiar to the recipient such as a company's domain name, customer domain name, bank domain name, and/or the like may give the domain name a high sophistication level. A familiar domain name may be a high sophistication level because the familiarity greatly increases a perceived legitimacy of the security item 112 and/or training item 124. As another example, sensible but not familiar information, such as a domain name, may have a medium sophistication level. As another example, nonsensical information, such as a nonsensical domain name, may have a low sophistication level since it greatly reduces the perceived legitimacy of the security item 112 and/or training item 124.

A sophistication calculator 210 may analyze a template 514 and identify trust indicators matching the trust indicators within the sophistication metrics 130. Sophistication calculator 210 may then add the weights associated with each identified trust indicator together to generate a sophistication score. The calculator 210 may then determine a sophistication level of the template based on the sophistication score. For example, a sophistication score below a first weight threshold may indicate that a template 514 is of a low sophistication level, a sophistication score below a second weight threshold and equal to the first weight threshold may indicate that a template 514 is of a medium sophistication level, and a sophistication score below a third weight threshold and equal to the second weight threshold may indicate that a template 514 is of a high sophistication level.

For example, template 514 includes a "From" field 502, an "Email Address" field 504, a "Subject Field" 506, and a "Content" field 508. A sophistication calculator 208 may analyze the "From" field 502 and identify its content, the type of the content and/or the attributes of the content. In this example, a sophistication calculator 208 may determine that the "From" field 502 includes a specific first name a specific last name. A sophistication calculator 208 may compare the specific content to the trust indicators in the sophistication metrics 130 and determine if a match exists. If so, a sophistication calculator 208 may assign weights of the matching trust indicators to the "From" field 502. A trust indicator may not limited to specific content items, but may also be a specific content type. For example, a trust indicator may be the content type of "Sender First Name", "Sender Last Name", "Sender First and Last Name", and/or the like. If a field does not include any content items/values, the sophistication calculator 208 may subtract points from the template's sophistication score.

As discussed above a trust indicator may alter a specific content attribute such as low sophistication, medium sophistication, high sophistication, and/or a combination thereof. A high sophistication content attribute may include a more familiar attribute, such as a familiar name in the "From" 502 field. Sophistication metrics 130 may include data that defines what constitutes a low sophistication level, medium sophistication level, and/or high sophistication level. For example, data may include a rule dictating that a name with a given number of consecutive consonants, a mixture of letters and numbers, and/or like may be of a low sophistication level. As another example, data may include a rule dictating that a name associated with a particular company, employee, and/or the like may be of a high sophistication level. As another example, data may include a rule dictating that data not meeting a low sophistication rule or a high sophistication rule may be of a medium sophistication level.

A sophistication calculator 208 may analyze each field in a template. For example, sophistication calculator 208 may analyze an "Email Address" field 504 and determine that this field includes an email address of a sender with a user name and domain. The sophistication calculator 208 may determine that the username and/or domain name is of a particular sophistication. For example, the sophistication calculator 208 may determine that a domain name is of high sophistication because it is familiar to the recipient at user system 104, 106 and results in an increased likelihood that the recipients will interact with a security item 112 and/or training item 124. A domain may be of a low sophistication if there is a high likelihood that the recipient at user system 104, 106 may not determine that a security item 112 and/or training item 124 generated from the template 514 indicates a security threat. The sophistication calculator 208 may analyze the sophistication metrics 130 to identify trust indicators and other weighted features matching the identified content, content types (user/domain names) and content attributes (high sophistication domain name). The sophistication calculator 208 may assign the weights of the identified trust indicators to the "Email Address" field 504. If the "Email Address" field 504 does not include any content items/values, the sophistication calculator 208 may subtract points from the template's sophistication score.

As another example, where a template includes a "Subject" field 506, the sophistication calculator 208 may analyze the "Subject" field 506 and determine that this field 506 includes at least one content item. The sophistication calculator 208 may analyze the "Subject" field 506 to determine attributes of the content item, such as whether the content item is sensible or nonsensical and/or familiar or unfamiliar. The sophistication calculator 208 may analyze the sophistication metrics 130 to identify trust indicators and other weighted features matching the identified content items, their types, and/or and their attributes (sensible, nonsensical, familiar, unfamiliar, etc.). The sophistication calculator 208 may assign weights of the identified trust indicators of the "Subject" field 506. If the "Subject" field 506 does not include any content items/values, the sophistication calculator 208 may subtract points from the template's sophistication score.

As another example, where a template includes a "Content" field 508, the "Content" field 508 may be analyzed by the sophistication calculator 208. Sophistication calculator 208 may determine that this field 508 includes an information field 528 that will display a recipient's first name, an information field 530 that will display a recipient's email address, and/or a hyperlink 526 that represents a security-based threat. The sophistication calculator 208 may analyze the sophistication metrics 130 to identify trust indicators and other weighted features that match these content items, their types, and/or the attributes. For example, the sophistication calculator 208 may search for trust indicators associated with information fields, hyperlinks, and/or the like. Sophistication calculator 208 may determine a sophistication level for the actual content of the message in addition to any security item 112 and/or training item 124 The "Content" field 508 content may be personalized since it includes both the recipient's first name and email address. As an example, the sophistication calculator 208 may determine that the content of the "Content" field 508 is of medium sophistication.

If the content includes additional identifying information, such as a recipient's first or last name, the content may be of a high sophistication level. Once the sophistication calculator 208 identifies trust indicators matching the content, content items, and/or content attributes of the "Content" field 508, the sophistication calculator 208 may assign the weights of the identified trust indicators to the field 508. Content may also decrease a template's sophistication. For example, where content includes a hyperlink that is nonsensical (e.g., made up of random characters, comprises suspicious domains, and/or the like), this may negatively affect a sophistication level. Content that negatively affects the sophistication of a security item 112 and/or training item 124 may decrease the sophistication score according to the sophistication metrics 119.

Once a sophistication calculator 208 completely analyzes template 514, a sophistication calculator 208 may transmit, display, and/or store a sophistication score 534 and/or corresponding sophistication level for the template 514. In the example shown in FIG. 5, the template 514 comprises a sophistication score of 14 points out of a total of 40 points.

If the user of security system 102 is satisfied with the content of the template 514 the user may add and store the template 514 with a campaign. A campaign profile 122 may then be updated to include an identifier identifying the newly added template 514 to the campaign. Multiple templates 114 may be added and/or stored with a campaign.

Figure 7:
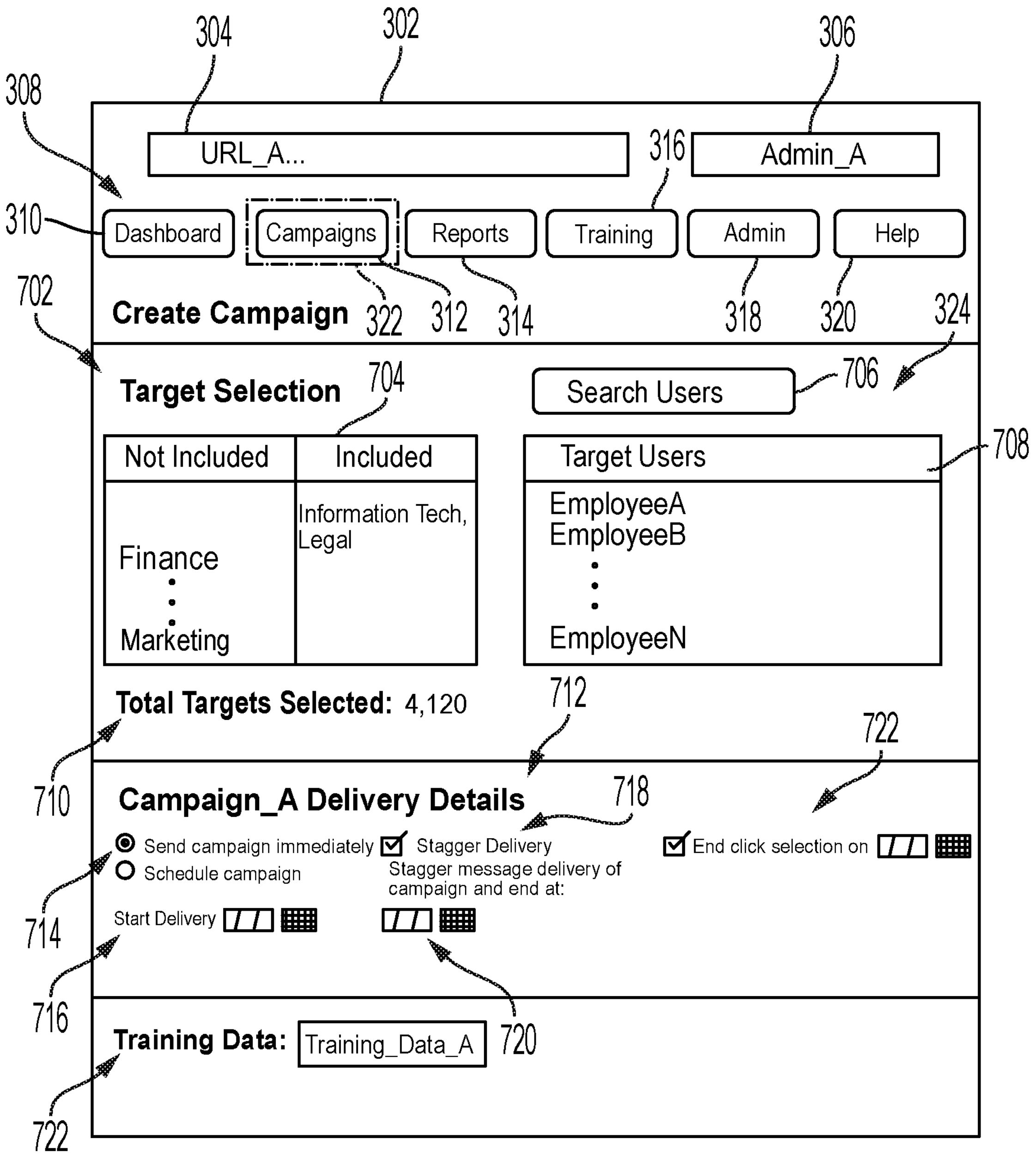
FIG. 7 depicts an example interactive environment presenting user selection and campaign delivery options for a campaign according to an embodiment of the disclosure.

Campaign manager 202 may target user options 722 to a user of user system 104, 106, as illustrated in FIG. 7. Target user options 722 may displayed to a user of security system 102 within the campaign area 324, within a new window/page of the interactive environment, and/or the like. A first target user option 714 may allow a user to select users of user system 104, 106, groups (e.g., finance group, marketing group, information technology group, legal group, intern group, etc.) within the entity associated with the campaign, and/or an entire entity. Each groups may include one or more users of user system 104, 106 to receive a security item 112 and/or training item 124 generated based on the template(s) of the campaign and/or manually generated.

Campaign manager 204 may transmit and/or display a list of groups not included within a campaign and a list of groups currently selected for the campaign. When a user of security system 102 selects a group, campaign manager 204 may display a list of individuals within the selected group. A user of security system 102 may select one or more individuals in the group and add to or remove them from a recipient/target list. Campaign manager 204 may display the name and/or identifier of employees.

A second target user option 716 allows the user to search for specific individuals to add to the recipient/target list for the current campaign. For example, the user enters either the first name and/or last name of an individual or enters a partial first name and/or a partial last name into a search box. As the user enters this information the campaign manager 204 displays a list of individuals with names matching the text entered into the search box. The user is able to select one or more of these users and add them to the target user list. The individuals within the selected groups and the individually selected recipients are then displayed in a target user area 718. In one embodiment, the total number of selected target users is displayed to the user in a portion 720 of the interactive environment 202.

Campaign manager 204 may populate and/or save the target user options 722 with group and employee information based on client and employee profiles. The campaign manager 204 may analyze the client profiles 120 to identify the various groups associated with the client and also analyze the employee profiles 122 to identify the employees of the client and the groups of the client associated with the employees. FIG. 8 illustrates examples of client (e.g., an entity utilizing the risk assessment manager 110) profiles and FIG. 9 shows examples of employee profiles. In the example shown in FIG. 8, each row 802, 804, 806 in the table 800 may correspond to a client profile. Each profile 802, 804, 806 also may store separate from one another.

The table 800 may include columns, each storing a different set of information. In this example, the table 800 includes a first column 808 entitled "Client ID;" a second column 810 entitled "Campaign ID;" a third column 812 entitled "Address;" a fourth column 814 entitled "Phone Number;" a fifth column 816 entitled "Contact;" a sixth column 818 entitled "Groups;" and a seventh column 820 entitled "Statistics." These columns of data are exemplary, additional columns of data may be included in table 800.

The "Client ID" column 808 may include entries 822 identifying a client associated with a client profile. The "Campaign ID" column 810 may include entries 824 identifying each security item 112 and/or training item 124 campaign that a client participated in. Entries 824 under the "Campaign ID" column 810 may include a pointer to the campaign profile corresponding to the campaign identified in this column 810. The "Address" column 812 may include entries 826 identifying an address of the client. The "Phone Number" column 814 may include entries 828 identifying a phone number of the client. The "Contact" column 816 may include entries 830 identifying a client contact for campaign correspondence. These entries may include, for example, the name of the contact, the phone number of the contact, the email address of the contact, and/or the like.

The "Groups" column 818 may include entries 832 identifying each of the organizational groups within the client such as, but not limited to, finance, marketing, legal, information technology, interns, support staff, and/or the like. The "Statistics" column 820 may include entries 834 with various types of statistical information for the client with respect to each campaign participated in. For example, statistical information for a given campaign may include information such as, but not limited to, a number of employees that interacted with security item 112 and/or training item 124, a number of employees that did not interact with a security item 112 and/or training item 124, a number of employees that interacted with a security item 112 and/or training item 124 in a way indicative of no or little security risk (e.g., generated a password with a given degree of security, answered a given number of questions in a questionnaire correctly, etc.), a number of employees that interacted with a security item 112 and/or training item 124 in a way indicative of a security risk (e.g., activating malware, spyware, a virus, downloading a file, answering questions incorrectly, etc.), a number of employees that reported a security item 112 and/or training item 124 to an administrator, and/or the like.

As discussed above, FIG. 9 illustrates an employee profile 118. Table 900 may include a first column 908 having the employee ID of the employee associated with the profile 118; a second column 910 entitled "Communication Address;" a third column 912 entitled "Client ID;" a fourth column 914 entitled "Campaign;" a fifth column 916 entitled "Security Item;" a sixth column 918 entitled "Action;" a seventh column 920 entitled "System Attributes;" and/or an eighth column 922 entitled "Statistics." These columns of table 900 are exemplary. Table 900 may include additional columns with various data. The "Employee ID" column 908 may include entries 919 identifying an employee associated with the employee profile. This column 908 may also include an entry 923 identifying the role of the employee within the client/company, and an entry 925 identifying the group within the client/company that the employee is a part of. The "Client ID" column 910 may include entries 924 identifying a client that the employee works for.

The "Communication Address" column 912 may include entries 926 identifying the messaging address (e.g., email address) of the employee. The "Campaign" column 914 may include entries 928 identifying a campaign in which the employee received security items 112 and/or training items 124. In one embodiment, the entries 928 under this column 914 may include a pointer to a client profile 122 corresponding to the client identified in this column. The "Security Item" column 916 may include entries 930 identifying the security item 112 and/or training item 124 for which the employee was a recipient in the identified campaign. The "Action" column 918 may include entries 932 identifying the action or behavior that the employee took with respect to the corresponding security item 112 and/or training item 124 identified in the profile. A lack of interaction with a security item 112 and/or training item 124 may be considered an action taken by the recipient. The "System Attributes" column 920 may include entries 934 identifying technical details of any employee's system (e.g., user system 104, 106) used to interact with the corresponding security item 112 and/or training item 124 identified in the profile. The "Score" column 921 may include entries 938 identifying the employee's risk score.

Returning to FIG. 7, a campaign manager 206 may present campaign delivery options 722 via the interactive environment 202. Campaign delivery options 722 may be displayed within the campaign area 324, within a new window, and/or the like. The campaign delivery options 722 may allow a user of security system 102 to configure delivery parameters associated with a campaign. A first delivery option 714 may schedule a campaign for immediate delivery. For example, as soon as the user of security system 102 finalizes and saves a campaign the security item generator 206 may automatically generate a security item 112 and/or training item 124 to be transmitted to the designated recipients at user system 104, 106 based on a template included 114 in the campaign. A second delivery option 716 may allow a user of security system 102 to enter a starting date and/or time and/or an ending date and/or time. When the specified start date and/or time occurs, the security item generator 206 may automatically generate and transmit a security item 112 and/or training item 124 to be transmitted to designated recipients at user system 104, 106 based on at least a template included 114 in the campaign. A third delivery option 718 may allow a user of security system 102 to select a staggered delivery of the campaign. When a user of security system 102 specifies an end date and/or time 720 for delivery, campaign generation and delivery may occur until that date and/or time.

When the user has selected a staggered delivery option, the security item generator 206 may automatically generate a security item 112 and/or training item 124 to be sent to designated recipients at user system 104, 106 based on a template 114 included in the campaign when the start/send condition has been met (i.e., the first or second delivery option 714, 716). The security item generator 206 may transmit this generated security item 112 and/or training item 124 at random and/or preselected times to designated recipients at user system 104, 106 such that all recipients have been sent the security item 112 and/or training item 124 by a specified end date 720. A staggered delivery option may ensure that the security item 112 and/or training item 124 is not sent to all designated recipients at the same time.

When a campaign only includes a single template 114 the scheduling/delivery parameters entered by the user for the campaign may apply to this single template 114. A campaign may include multiple templates 114 with each template generating a different security item 112 and/or training item 124. For example, a campaign may be an introductory campaign designed to generate an initial risk score for a user of user system 104, 106. As another example, a campaign may include a number of security items and/or training items relevant to a particulate topic (e.g., passwords, remote/travel, web safety, and/or the like).

Default scheduling/delivery parameters and/or user defined scheduling/delivery parameters may be applied to each security item 112 and/or training item 124 in a campaign. For example, a user of security system 102 may define scheduling/delivery parameters for a first set of security items 112 and/or training items 124 generated from a first template 114. Then, a user of security system 102 may define scheduling/delivery parameters for a second set of security items 112 and/or training items 124 generated from a second template 114 in the campaign. In this example, a campaign manager 206 may display to a user of security system 102, a list of templates 114 selected for the campaign within the delivery option area 712. The user may select a first of these templates 114 and define the scheduling/delivery parameters, as discussed above. The user may then select a second of these templates 114 and define the scheduling/delivery parameters using the process discussed above. Scheduling/delivery parameters also may be defined as part of the template selection/modification process such that the user of security system 102 is not required to wait until all templates have been added to the campaign before configuring the scheduling/delivery parameters of each template 114.

When scheduling the transmission of different sets of security items 112 and/or training items 124 generated from different templates and/or that have been manually generated, each of the different sets of security items 112 and/or training items 124 may be transmitted based on temporal parameters and/or rules. For example, a first set of security items 112 and/or training items 124 may be sent starting on a given date. A second set of security items 112 and/or training items 124 may then be sent on a different date, after a predetermined amount of time has passed after sending the first set of security items 112 and/or training items 124. A user of security system may define or select one or more rules indicating that a first set of security items 112 and/or training items 124 are to be set as the initial security items, while the second set of security items are to be sent based on feedback obtained from the first set of security items 112 and/or training items 124.

For example, a security item 112 and/or training item 124 from a first set of security items 112 and/or training items 124 may be associated with a first sophistication score such as a low sophistication score. A security item 112 and/or training item 124 from the first set of security items 112 and/or training items 124 may be sent to the designated recipients at user system 104, 106. A second security item 112 and/or training item 124 from a second set of security items 112 and/or training items 124 may be associated with a second sophistication score, which is a higher sophistication score than the first security item 112 and/or training item 124.

In other words, the second security item 112 and/or training item 124 may be less suspicious than the first security item 112 and/or training item 124. In this example, the user of security system 102 may define a rule (or selects a rule from a plurality of predefines rules) that states a second security item 112 and/or training item 124 may be sent to a recipient at user system 104, 106 only if the user has previously performed in a particular manner with security items 112 and/or training items 124 associated with the first sophistication level. Accordingly, a second security item 112 and/or training item 124 may be sent to a recipient at user system 104, 106 based on the recipient's performance history and/or risk score.

A campaign may be configured to send different security items 112 and/or training items 124 to different recipients based on a performance history, role, associated group, risk score, and/or the like. For example, a rule may be defined by a user of security system 102 such that if a recipient at user system 104, 106 performs in a previous campaign such that the user is proficient/trained in a particular security item 112 and/or training item 124, security items 112 and/or training items 124 for a subsequent campaign may selected based on the sophistication level of the previous campaign and/or a current risk score of a user of user system 104, 106. A user of security system 102 also may define a rule that states recipients associated with a given role are to receive security items 112 and/or training items 124 of a given sophistication level. Scheduling parameters and/or rules may be stored within a campaign profile 122 for the corresponding campaign.

In addition to configuring the scheduling/delivery parameters and/or rules for a campaign, a user of security system 102 may associate a training item 124 with a template 114 (or to a specific security item 112 and/or training item 124). For example, FIG. 7 illustrates an option 722 that allows a user to select and/or create one or more training items 124 for a given template 114 of a campaign. If a template is already associated with a default training item 124, a user of security system 102 may modify the training item 124 and/or select a new training item 124 for the template 114.

A training item 124 may include a text, graphics, audio, video, and/or the like to transmit to a user of user system 104, 106 before, during, and/or after interaction with a security item and/or first training item 124. For example, a training item 124 associated with a template including a security item 112 may display the associated training item 124 before, during, and after interaction with the security item 112 to educate a user at user system 104, 106 about a security item 112. When a template includes a first training item 124 (e.g., a questionnaire regarding a particular topic), a second training item 124 may be associated with the first training item 124 to educate a user of user system 104, 106 about the subject of the first training item 124. For example, a training item 124 that includes a questionnaire may associate a second training item 124 to be displayed when a user at user system 104, 106 answers a question incorrectly.

For interaction with an associated training item 124 before and/or during interaction with a security item 112 and/or initial training item 124, an associated training item 124 may include text, audio, and/or video to inform a user at user system 104, 106 about the security item 112 and/or initial training item 124. An associated training item 124 may be displayed at user system 104, 106 within a web page via the user's web browser, within a document in a text editing program, via audio, via a movie, and/or the like.

Once the user of security system 102 has created and/or modified a campaign (e.g., provided a name for the campaign, selected one or more templates for the campaign, provided scheduling/delivery parameters and/or rules for the campaign), a campaign may be saved in data storage associated with security system 102. A campaign may be saved and/or stored at any point during the creation or modification process with security system 102.

The campaign manager 206 may create and/or update a campaign profile 122 for a campaign based on information provided by the user of security system 102. FIG. 10 shows campaign profiles 122 where each campaign profile 122 includes a number of entries (rows) 1002, 1004, 1006 in a table 1000. Each campaign profile 1002, 1004, 1006 may be stored separate from one another. For example, table 1000 may include a first column 1008 entitled "Campaign ID;" a second column 1010 entitled "Campaign Title;" a third column 1012 entitled "Template IDs;" a fourth column 1014 entitled "Client;" a fifth column 1016 entitled "Target Users;" a sixth column 1018 entitled "Scheduling Parameters;" a seventh column 1020 entitled "Rules;" and/or an eight column 1021 entitled "Statistics." Table 1000 may include additional columns to store any additional information relevant to a campaign.

The "Campaign ID" column 1008 may include entries 1022 identifying the campaign associated with the campaign profile. The "Campaign Title" column 1010 may include entries 1024 with the title/name of the associated campaign. The "Template IDs" column 1012 may include entries 1026 identifying the templates and/or a pointer to the template profiles 116 associated with the templates that have been added to the campaign.

The "Client" column 1014 may include entries 1028 identifying the client associated with the campaign. The "Target Users" column 1016 may include entries 1030 identifying the users and/or user systems 104, 106 who are to receive security items 112 and/or training items 124 associated with the campaign. The "Scheduling Parameters" column 1018 may include entries 1032 with the scheduling parameters for the campaign. As discussed above, the scheduling parameters may indicate when a campaign is to begin/end, if the delivery of security items 112 and/or training items 124 is to be staggered, and/or the like. The "Rules" column 1020 may include entries 1034 with the delivery rules for one or more security items 112 and/or training items 124 included in the campaign.

As discussed above, a delivery rule may include a rule that identifies an initial set of security items 112 and/or training items 124 to be sent to recipients at user systems 104, 106 and a subsequent set of security items 112 and/or training items 124 that are to be sent to the recipients at user systems 104, 106 based on the recipients' performance with respect to the initial set of security items 112 and/or training items 124 and/or a risk score. A delivery rule also may indicate that a first set of security items 112 and/or training items 124 are to be sent to a first set of recipients at user systems 104, 106 with a first role type and a second set of different security items 112 and/or training items 124 are to be sent to a second set of recipients at user systems 104, 106 with a second role type that is different than the first role type. The "Statistics" column 1021 may include entries 1036 with various types of statistics associated with a campaign. Statistics associated with a campaign may include information such as (but not limited to) the number of times security items 112 and/or training items 124 generated from a template were interacted with (e.g., opening a simulated phishing message, completing a training video and/or questionnaire) by a recipient at user system 104, 106; the number of times a simulation associated with a security item 112 and/or training item 124 generated from the template were interacted with by the recipient at user computer 104, 106; the starting date of the campaign the stopping date of the campaign; the status of the campaign (e.g., pending, running, completed, etc.); and/or the like.

Assessing Security Risks of Users in Computing Networks

Once a campaign has been saved the risk assessment manager 110 may use the associated templates to generate one or more security items 112 and/or training items 124 to transmit to target users at user systems 104, 106 for presentation.

Security items 112 and/or training items 124 may be presented to target users via an input/output interface on user systems 104, 106 without a campaign. Manually generated security items 112 and/or training items 124 (i.e., security items 112 and/or training items 124 generated without a template) may also be presented to target users. As will be discussed in greater detail below, the risk assessment manager 110 may receive input data 131 collected on user systems 104, 106 based on a target user's interaction with security items 112 and/or training items 124, data 133 collected based on existing user data (e.g., usernames, passwords, security questions, and/or the like), and/or data 138 collected based on technical information associated with the user's device.

The risk assessment manager 110 may use these inputs to calculate a user risk score. This user risk score may provide an organization with a quantified indication as to the level of risk a given user exposes the organization to with respect to the security of its computing networks. The user risk score may be used to influence, guide, and/or determine the frequency and sophistication level of future campaigns, security items and/or training items 124. The user risk score may also be used within an end user's technical security controls to determine how a user is treated on a technical level (e.g. firewall, proxy, or email restrictions, more detailed logging over user's activities, etc.). For example, when a user's risk score is within a predetermined range, various security controls may be implemented associated with the user.

A security item 112 and/or training item 124 campaign may be manually started by a user of security system 102 or automatically started based on scheduling parameters. If a campaign is started automatically, the campaign manager 204 may identify the scheduling parameters associated with a campaign from the campaign profile 122 of the campaign. The campaign manager 204 may monitor for a temporal condition to occur that satisfies the scheduling parameters. For example, if a scheduling parameter states that the campaign is to start on Date_A at Time_A, when the campaign manager 204 detects Date_A at Time_A occurs the campaign manager 204 may automatically start the campaign.

Once a campaign has been started, the security item generator 206 may analyze the profile 122 of the campaign to identify users and/or user systems 104, 106 who are to be presented with security items 112 and/or training items 124 as part of the campaign. For example, the item generator 206 may analyze the "Target Users" entry 1016 of the profile 122 and identify a user group (finance, marketing, legal, etc.), individual user IDs, individual communication addresses (email addresses, instant messaging addresses, phone number, etc.), and/or the like. If a user group is provided, the security item generator 206 may analyze employee profiles 118 to identify employees associated with the campaign belonging to the identified group.

For example, consider a campaign CP_1 created for client Client_1. The profile for CP_1 may include user groups such as the Finance group, the Information Technology Group. The profile may also include a recipient with the user ID Emp_1, a recipient with the user ID Empl_15, an individual with an email address of emp_A@domain.

For each of the identified groups, the security item generator 206 may analyze the employee profiles 118 to identify employees of client Client_1A with a group entry matching, for example, "Finance" or "Information Technology." This information may be stored within the client profile 120 and/or the campaign profiles 122. Based on the profiles shown in FIG. 9, the security item generator 206 may identify employee Emp_1 as belonging to the Information Technology group of client Client_1. Therefore, the security item generator 206 may retrieve the communication address (e.g., Msg_Addr_A) of Emp_1 (or any other identifier that allows a security item 112 and/or training item 124 to transmitted to the appropriate user at user device 104, 106). The security item generator 206 may perform a similar process with respect to user IDs that were identified in the campaign profile 122.

Item generator 206 may analyze campaign profile 122 to identify the template(s) 114 associated with the campaign. For example, item generator 206 may identify the ID of the template(s) 114 associated with the campaign from the campaign profile 122. Item generator 206 may retrieve the template(s) and/or template profiles 122 matching these IDs and generates one more security items 112 and/or training items 124 based thereon. For example, item generator 206 may analyze the profile 122 for campaign CP_1 and determine that this campaign is associated with templates Temp_1 to Temp_N.

The message generator 206 may analyze a number of templates 114 and/or template profiles 122, and identify the template(s) 114 corresponding to the template IDs obtained from the campaign profile 122. Item generator 206 may then loads each of the templates 114. When template profiles 122 include all of the template data including field data, structure data, formatting data, content data, and/or the like, item generator 206 may generate a template 114 from the template profile 122.

Figure 11:
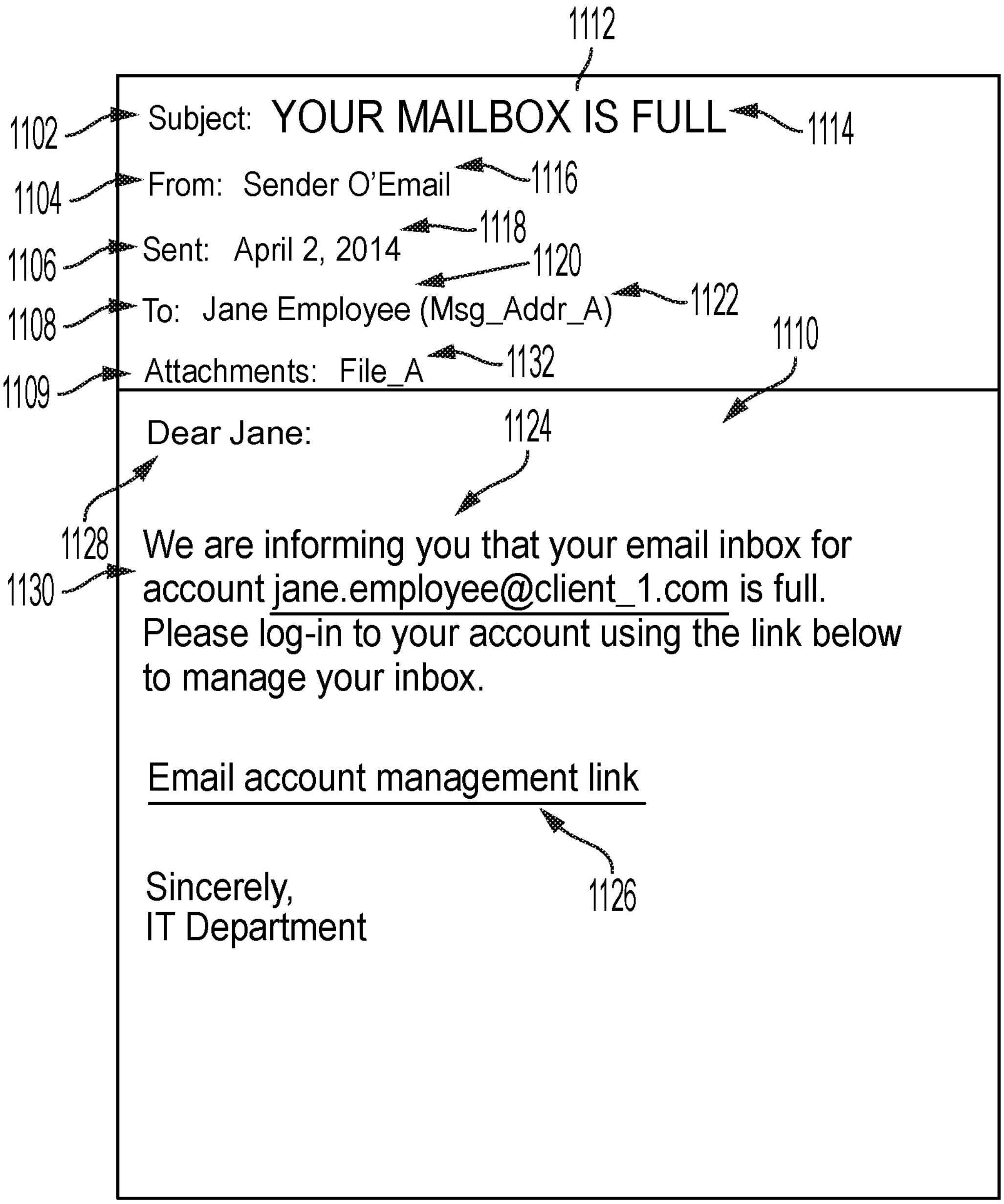
FIG. 11 depicts an example security item and/or training item generated from a template according to an embodiment of the disclosure.
Figure 15:
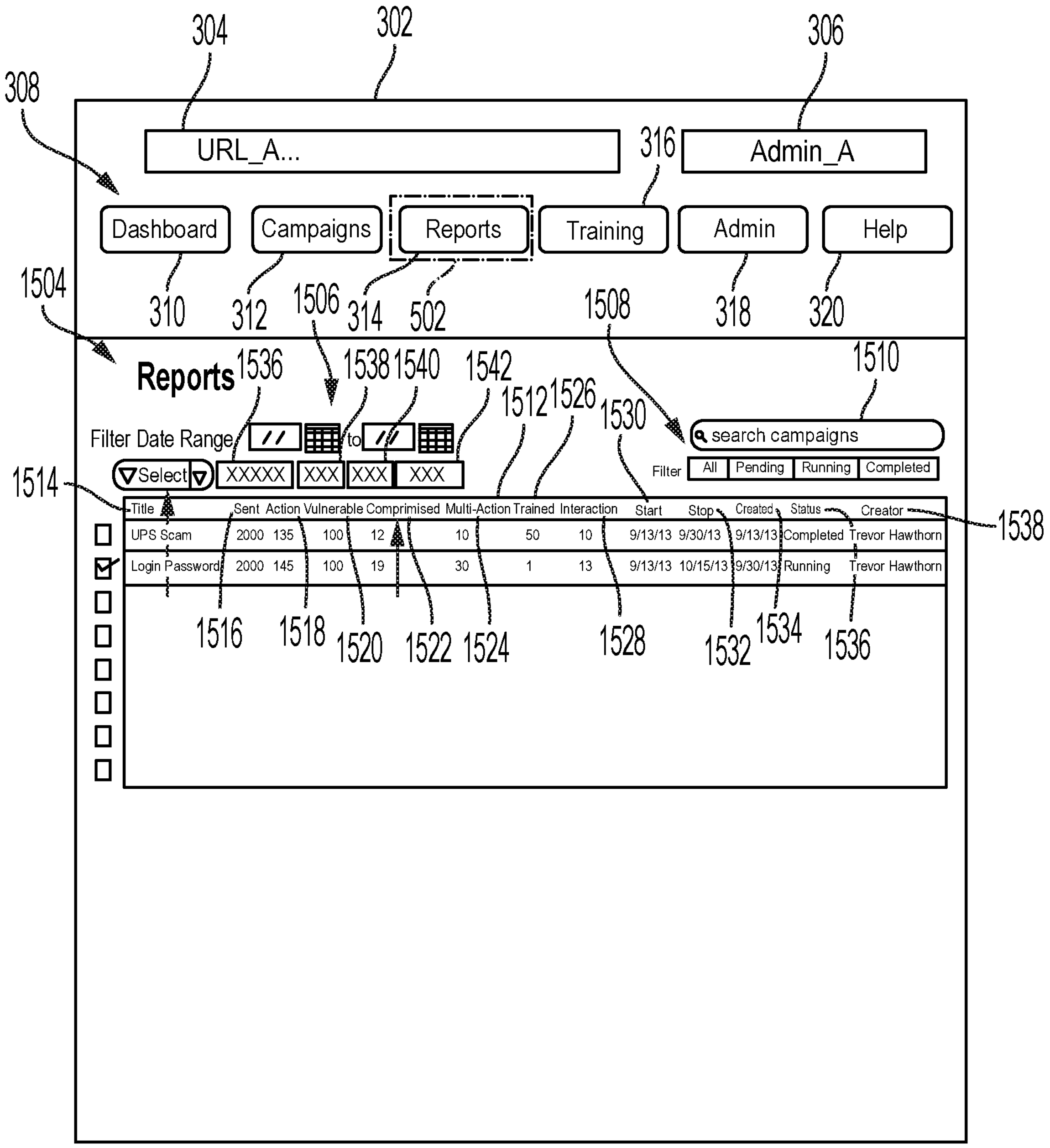
FIG. 15 depicts an example interactive environment presenting a list of campaigns according to an embodiment of the disclosure.

The item generator 206 may use a template 114 to generate an initial security item 112 and/or training item 124 for each of the target users of the campaign. For example, FIG. 11 illustrates an example security item 112 generated to simulate a phishing message. Although not illustrated, other security items 112 and/or training items 124 may be generated and/or transmitted to target users. These additional security items 112 and/or training items 124 may include, for example, data associated with introductory security information, phishing information, social media information, remote and/or travel-related information, password information, social engineering information, web safety information, data protection information, email security information, computer security information, physical security information, simulation data associated with any of the preceding information, and/or any combination of the above.

In the example of FIG. 11, which illustrates a phishing-related security item, the security item 112 may include a message comprising a security-based threat. Similar to the template 514, the generated security item 112 may include a "Subject" field 1102, a "From" field 1104, a "Sent" field 1106, a "To" field 1108, an "Attachments" field 1109, and a message body section 1110. The "Subject" field 1102 may include the subject content 1114 provided by the template 514. The "From" field 1104 may include the name 1116 of the sender provided by the template 514. The "Sent" field 1106 may include the time and date 1118 of when the message was sent. The "To" field 1108 may include the name 1120 and email address 1122 of the recipient obtained from the corresponding employee profile 118.

The message body 1110 may include message content 1124 and a hyperlink 1126 provided by the template 514. In addition, the information fields 528, 530 within the template 514 may be dynamically populated by the item generator 206 to include the first name 1128 and the email address 1130 of a recipient. The item generator 206 may obtain a recipient's name and email address from the user profile 118 (or any other profile comprising this information) associated with the recipient. The security item 112 may also include an attached file 1132 corresponding to the file ID identified in the "Attachments" field 510 of the template 514. In this example, the generated security item 112 may include a medium sophistication level, which corresponds to the sophistication level of its template 514.

Item generator 206 may generate the same security item 112 and/or training item 124 (with the exception of any personalized content) for each of the users identified in a campaign. In addition, different security items 112 and/or training items 124 may be generated for different users associated with user systems 104, 106. Accordingly, item generator 206 may analyze the rules associated with the campaign profile 122 (or stored at some other location) and determine if a given recipient is to receive a different security item 112 and/or training item 124. For example, a sophistication level and/or content of security items 112 and/or training items 124 may vary across recipient users of users systems 104, 106 based recipient's role, past performance history, a risk score, and/or the like.

An initial campaign may determine an initial risk score for a user, group of users, and/or organization. Additionally, an initial campaign and/or calculated risk score may determine subsequent security items 112 and/or training items 124 that may be generated and/or transmitted to users at user systems 104, 106.

For example, initial security item 112 and/or training item 124 may be generated from the initial template. Item generator 206 may generate a security item 112 and/or training item 124 for the recipient that satisfies the parameters/conditions in the rules. For example, one rule may indicate that a recipient with a given role (e.g., CEO) may initially receive a security item 112 and/or training item 124 asking the recipient to provide network password information at a given sophistication level. Item generator 206 may then analyze the templates selected for the campaign and identify a template that satisfies the rule. In another embodiment, the item adjuster 218 may dynamically and automatically adjust a template to include and/or remove trust indicators and/or content to satisfy the rule (e.g., sophistication level and/or content requirements). In the example of password generation, a sophistication level and/or content may be altered to include more or less rules associated with password generation, more or less guidance associated with password generation and/or the like.

Once a security item 112 and/or training item 124 is generated, the item presenter 208 may transmit the security item 112 and/or training item 124 to the target user at user system 104, 106. Security item 112 and/or training item 124 may be presented to a user by transmitting the security item 112 and/or training item 124 to the users' recipient's address specified in the security item 112 and/or training item 124 (e.g., an email address, telephone number, messager username, IP address, and/or the like).

A user may receive the security item 112 and/or training item 124 via an input/output module on user system 104, 106. Security items 112 and/or training items 124 may be transmitted to the user via applications, a web page, and/or the like. A user profile 118 of the user and/or one or more addition profiles may be updated by the risk assessment manager 110 to indicate that a user was presented with a security item 112 and/or training item 124 of a given sophistication level. A user profile 118 may be updated to identify the content of the security item 112 and/or training item 124 (e.g., what time of security item 112 and/or training item 124 was transmitted to the user).

A security item 112 and/or training item 124 count may be stored within the user profile 118 and updated and optional metadata associated with each security item 112 and/or training item 124 (e.g., sophistication level, security threat types, etc.) may be stored within the profile 118. The security item 112 and/or training item 124 count and security item 112 and/or training item 124 metadata may be stored within statistics data of the user profile 118. Information may also be stored within other profiles such as the campaign and template profiles as well.

Risk assessment agent 142 at the user's system 104, 106 may detect when a user receives and/or is presented with a security item 112 and/or training item 124. A security item 112 and/or training item 124 may include an embedded identifier that allows the agent 142 to distinguish and/or identify security items 112 and/or training items 124.

The agent 142 also may monitor the user's interaction and/or feedback associated with the security item 112 and/or training item 124. For example, agent 142 may detect if and when a user interacts with, responds to, and/or reads a security item 112 and/or training item 124. For example, agent 142 may detect when a user selects a hyperlink within security item 112 and/or training item 124, provides an incorrect or correct answer to a question within the security item 112 and/or training item 124, generates a secure or unsecure username/password, etc. The agent 142 may determine that a user has interacted, responded to, and/or read a security item 112 and/or training item 124 when the users performs an action (e.g., clicks on a link, opens a message, responds to a message, enters data in a field, watches a video, listens to a lecture, and/or the like).

For example, security item 112 and/or training item 124 may include content such as (but not limited to) an N×N transparent pixel that prompts the client 134 to ask the user if the user would like to download an external/remote content. When a user selects the option to download this content, the agent 142 may determine that security item 112 and/or training item 124 has been opened. Other methods for determining when the user has interacted, responded to, and/or opened a security item 112 and/or training item 124 may be applicable as well.

In addition to opening a security item 112 and/or training item 124, the agent 142 may detect when the user, previews the security item 112 and/or training item 124 (reads a message without opening it), deletes the security item 112 and/or training item 124, fails to open the security item 112 and/or training item 124 after a given amount of time, and/or the like.

In an example where the security item 112 and/or training item 124 includes a message, once the user opens the message the agent 142 may monitors if the user interacts with any of the items therein or attached thereto. For example, the agent 142 may monitor when the user selects a hyperlink within the message, enters information into fields on a simulated webpage that is brought up by selecting the hyperlink, opens a file attached to the message, and/or the like. When a security item 112 and/or training item 124 includes a questionnaire, challenge/response item, an interactive application, and/or the like agent 142 may monitor user interaction with the questionnaire, responses, interactive application and/or the like. An interactive application may include, for example, a webpage and/or browser executable code that request a user to interact with various games and/or tasks (e.g., selecting items from a list, highlighting items, playing a game and/or the like).

Examples of security items and training items that the system may select and help deliver include:

(i) sending a mock malicious message (e.g., SMS, MMS, instant message, in-channel message delivered by a service such as a social networking site, or a message delivered using some other messaging technology such as WhatsApp) to a user (e.g., a mock malicious message with a mock malicious URL or a mock malicious attachment, or a mock malicious phone number, or a mock request for sensitive information);

(ii) a mock social networking attack involving a mock malicious post or update such as a post or update containing a mock malicious URL (e.g., a URL for a mock malicious website that prompts the user to enter sensitive information or exposes the user's device to mock malware) including a mock malicious URL that relies on one more levels of redirection, mock malicious attachment (e.g., a mock malicious picture, video, audio clip), a mock malicious phone number, a mock malicious barcode (e.g., QR Code®) that when read by a barcode scanner causes the computing device to access or download mock malware, a mock malicious post enticing a user to perform an activity that puts him, others, his organization or his country at risk;

(iii) giving a mock social engineering call to a user (including using a computer system to automatically place the phone call and interact with the user through an automated menu or some automated dialogue functionality such as Interactive Voice Recognition technology, multi-modal interactive technology, voice over Internet protocol (VOIP) technology, automated speech recognition technology, some other automated dialogue functionality) with the call requesting the user to provide sensitive information or to initiate a possibly sensitive activity (e.g. granting someone access to a resource, resetting someone's password, telling or requesting a colleague to do something, sending information to a colleague, installing malicious code, entering erroneous information in a computer system, evacuating a building in response to a mock malicious alert), instructing a colleague to ignore a warning, enticing someone to spread false information, or generally engaging in any other activity that could compromise the user's security or reputation, that of his organization or his country or that of some other people, organization or country;

(iv) leaving a mock malicious memory device such as a universal serial bus (USB) storage device on which mock malware at one or more locations where a user may be lured to pick up the device and plug it into a computer, directly giving or sending a USB or other memory device on which mock malware is stored to users to plug into their computer, dropping at one or more locations (e.g., a company cafeteria, booth at a tradeshow) some other portable memory device such as a DVD or an SD card with mock malware for users to possibly pick up and access from one of their computers, directly giving or sending some other portable memory device such as a DVD or an SD card with mock malware to users to access from one of their computers;

(v) placing a mock malicious barcode (such as a quick-response QR Code® or other matrix code) or some other type of bar code on an object such as a poster or wall so that the code, when scanned by a mobile electronic device or some other computer device, causes the device to be directed to a mock phishing website, initiate the download of mock malware (e.g., a mock malicious software app) on that computer device, connect the device to a mock malicious service, or contributes to the delivery of a mock attack on another user;

(vi) placing mock malicious short range tags such as mock malicious near field communication (NFC) or radio frequency identification (RFID) tags, or equivalent tags on objects with the tags when read by a mobile device or some other computer device, causing the device to be directed to a mock phishing website or a mock malicious service, initiating the download of mock malware on the device, demonstrating to users how such tags could expose them to other risks, or contributing to the delivery of a mock attack on another user;

(vii) exposing a user to a piece of mock malware such as placing a mock malicious app in an app store (possibly a mock app store or a mock malicious app store link), or file transfer site (or mock transfer site) and providing the user with a link or other means to entice the user to obtain and download the mock malware (such as by displaying a message inviting the user to obtain what is described as antivirus software, but what instead is fake malicious software, or enticing the user to download a new game app), or distributing mock malware through various means such as using mock malicious memory devices or using mock malicious bar codes or mock malicious URLs as already described above;

(viii) deploying a mock rogue wireless service such as a mock rogue Wi-Fi access point or mock malicious short range communication service (e.g. mock Bluetooth pairing) to lure users to connect via these mock rogue access points or communication services (e.g. by deploying such mock rogue services on company premises, near a coffee shop where employees of a company often go, or in an airport lounge;

(ix) deploying some other mock rogue, compromised or malfunctioning device or service such as a mock compromised keypad or some other mock rogue, compromised or malfunctioning authentication or access granting device or service (e.g. mock malfunctioning electronic lock) that a well-trained user should be able to spot and possibly report; mock unapproved hardware that could be used by an attacker to obtain sensitive information or sensitive access (e.g. mock spying camera or microphone that a well-trained user should be able to spot and report), mock rogue jamming equipment that a well-trained user should report, mock malfunctioning access device, etc.;

(x) using some other mock attack to entice (i.e., lure) users to do any of the following: access mock malicious websites; install mock malware on one of their computer devices; open mock malicious message attachments; disclose sensitive or dangerous information in a mock context; engage in a mock context in some other activity that has the potential of putting them, their organization, their country, others, other organizations or other countries at risk or of damaging their reputation; fail to engage in a mock context in some activity that, if not implemented, could have similarly deleterious consequences.

(xi) repurposing an actual attack by making it harmless (e.g. replacing a poster that includes a malicious QR Code with an identical poster that includes a mock malicious QR Code, replacing a malicious attachment in an SMS message with a mock malicious attachment) and using the resulting attack as a mock attack to estimate the user's vulnerability to similar attacks.

User action monitor 214 of the risk assessment manager 110 may monitor the user's actions with respect to the security item 112 and/or training item 124. For example, when a user interacts with the security item 112 and/or training item 124 as described herein, a script embedded within security item 112 and/or training item 124 may generate code that is then transmitted from user system 104, 106 to the user action monitor 214 identifying this action.

One or more sensors may detect one or more aspects of a user's behavior or activities (user actions) as the user interacts with an interaction item. The sensors may be part of the end user electronic device, and/or the system may rely on external sensors. The system may analyze data that it directly or indirectly received from the end user device sensors and/or external sensors. For example, the sensors may include hardware, software, electromechanical devices, bio-sensory devices, and sources of information provided by third parties. The sensors may be used to sense one or more aspects of a user's activities or behavior, whether in the context of routine activities or in response to artificially created situations. The sensors may detect various actions of a user in response to a training item or security item, such as whether the user is downloading an attachment or installing an application, the user's browsing history, and other data.

Examples of behavior or activity sensors in the cybersecurity assessment and training domain include sensors that detect attachments in emails sent or received by a user, sensors to determine whether one or more users access different services over secure connections, sensors to identify the number, type and/or identity of applications installed on a user's mobile phone, sensors to track the physical locations that a user visits, sensors to keep track of the URLs that a user visits. Some sensors can also include, for instance, sensors to detect USB key usage, record browsing history, identify Bluetooth headset use, sensors that detect the number or types of emails received, sensors that inspect the content of emails, and sensors that track the physical location of users. Sensors can also include Mobile Device Management (MDM) clients and MDM infrastructure or Data Leakage Prevention (DLP) functionality, as well as data obtained from an MDM system, DLP system, firewall system, email filtering system, browsers, network proxies, or other types infrastructure components that can be used to monitor user activities and behaviors as well as other relevant contextual attributes (e.g. types of websites a user visits, emails they receive, phone numbers they call or receive calls from).

The sensors can be embedded in or interface with smart phones, laptop computers, desktops, tablets, e-readers, body parts, or any other devices, appliances or elements of the user's local or global environment (e.g. smart home, smart car, smart office, or other mobile or pervasive computing device or appliance, including medical devices, surveillance cameras, and other environmental sensors). A sensor may include a data storage device or processor, for example in microprocessor form, and can obtain data provided by the user, by people other than the user, by organizations, or by entities including colleagues, friends, family members, strangers, doctors. A sensor may alternately or in addition obtain data provided by systems (including data aggregated and synthesized from multiple sources, including aerial sensors, space-based sensors, implanted devices, and medical devices). For example, a sensor may sense calendar information, status updates on social networks, and credit card transactions and can sense information or actions obtained through video surveillance. Some sensors may also sense a combination of data. Some sensors may also sense that the user has fallen for a mock attack, including any of the mock attacks identified above.

Additional examples of sensors are described in FIG. 23. Sensors may be part of a risk assessment agent 142, or they may communicate with a risk assessment agent 142, as described in this document.

Other examples of sensed data may include, for example:

i. filenames or other data relating to content of a user's saved file directory, such as a directory of saved email attachments or a directory of files downloaded using a browser client;

ii. data relating to the configuration of the user's browser, operating system, or some other software running on a device with which the user interacts;

iii. data indicating whether the user is using or has used a computing device on a Wi-Fi network, and whether or not the Wi-Fi network is a secured network or known, trusted network;

iv. location data obtained through one or more technologies (e.g., Wi-Fi location tracking, cell phone triangulation, Bluetooth beacons, RFID tags, credit card transactions, GPS, smartphone APIs, browser APIs, IP address) indicative of places where the user goes, or where the user has operated or attempted to access a particular computing system;

v. a phishing sensor, such as a monitor that receives data indicating whether (and optionally how frequently) a user visits or attempts to visit one or more blacklisted web sites, or a sensor looking at the number of emails received by a user and flagged as phishing emails by an email filter;

vi. a password vulnerability sensor, such as a monitor that receives data indicating how often a user changes his password or a sensor that estimates the strength of passwords selected by a user (e.g., the password must contain a minimum number of characters or a certain type or combinations of types of characters, such as at least one capital letter, at least one lowercase letter, and at least one number, or have some minimum length);

vii. an external memory device monitor that receives data from a computer indicating when an external memory device such as a USB memory device has been connected to a communication port of an electronic device operated by a user, potentially allowing for the transfer of malicious files on that electronic device;

viii a social networking sensor, such as a monitor that receives data from a browser or browser plug-in estimating the time that the user has spent accessing one or more known social networking websites; or ix. a social networking sensor that crawls known social networking sites looking to estimate the level and type of social networking activities in which users engage (e.g., data files, photos, videos, or comments posted by a user, location information leaked by a user, photos where a user is tagged, number of friends a user has). This may include estimating the amount of such data or activities, their frequency, their level of sensitivity, etc.

When the agent 142 detects that the user has interacted, responded to, and/or opened security item 112 and/or training item 124 the agent 142 may notify the risk assessment manager 110 of this action. In addition, the agent 142 may collect technical information 138 associated with the user's system and/or user properties 136 (e.g., existing usernames, passwords, security questions, answers, and/or the like) and transmit this information to the risk assessment manager 110. The agent 142 may collect the user property data 136 and/or technical information 138 prior to detecting that the user has interacted with, responded to, and/or opened security item 112 and/or training item 124.

The system may detect an interaction event comprising an action of the user (or lack thereof) in response to the interaction item. By extension, the sensed user response should also be understood to include sensing attributes of activities in which the user engages that expose him or her to particular risks. Examples include sensing that:

a) a user is discussing sensitive matters on a smartphone in a public space;

b) a user is entering password information where he or she is at particularly high risk of a shoulder surfing attack;

c) a user has requested a blacklisted website;

d) a user has opened an email attachment; or e) a user has posted to a social network.

A sensor may directly detect the interaction event, or the system may receive data that is collected by a sensor. The data may correspond to user activities or behaviors or, more generally, other contextual attributes relevant to the selection of appropriate training interventions in response to a given mock attack or at a later stage. Such contextual attributes may include any relevant sensory data as well as information obtained from other relevant sources of information, such as browser history, credit card records, surveillance cameras, electronic doors, employment records, information collected about a person with which the user has interacted, and social networking information. They can also include time data, duration data, and any other relevant information about the user's interaction with a mock attack situation (e.g., sensitive information provided by the user, voice recording of the user's interaction). The interaction signature can be produced in various ways including using cryptographic hashes of one or more attributes of an interaction event. In some embodiments, sources of sensory data may forward sensed information to one or more other participant computers. In one instance, a software or executable program will run on a participant computer or device and locally process sensed data to detect one or more relevant interaction events prior to forwarding the detected information (e.g. in the form of interaction signatures) to a storage system. The executable program may include logic to locally deliver just-in-time training interventions in response to particular interaction events. In some embodiments, user data can be forwarded directly to the analysis host computer or computers responsible for hosting the policy manager. The storage system may be responsible, among other things, for storing sensed user data. The system may detect an action of the user 120 by filtering sensed data, aggregation of sensed data, pre-processing of the sensed data, analysis of the sensed data, and/or receipt of one or more event interaction signatures.

Examples of the technical information 138 collected by the agent 142 may include, but are not limited to, the type of system (e.g., desktop, notebook, tablet, smartphone, wearable computing device, etc.) utilized by the user; the Internet Protocol (IP) address of the system; the location of the system; the network (e.g., work, home, hotel, etc.) used to access the security item 112 and/or training item 124; network type (wired, wireless, VPN, etc.) the messaging client used by the user; web browser utilized to access the security item 112 and/or training item 124; operating system; anti-virus software, firewall software, internet security software; the number and severity of technical vulnerabilities present on the device; the level of difficulty to exploit the vulnerabilities; the source Internet Protocol (IP) address of the device; exposure to less-trusted networks; exposure to less-trusted user populations; sensitivity of the data the device stores or transacts; compensating controls; and/or the like.

A vulnerability with respect to an application, such as a web browser, may be determined based on fingerprinting the application versions and comparing them against current versions. Any application version that is less than a current version may be deemed a vulnerability and may negatively impact a risk score. Additionally, any application version that changes in a manner deemed to be vulnerable may trigger an alert to security system 102, which may then recalculate a risk score for an individual, group of individuals, and/or organization. The more applications deemed to be vulnerable, the more vulnerable the platform and the worse the risk score. Conversely, vulnerability may be applied to specific users. If a user consistently acts with a security item 112 and/or training item 124 in a negative way, the user's risk score may increase. If a user consistently acts with a security item 112 and/or training item 124 in a positive way, the user's risk score may decrease.

Agent 142 may transmit a communication to the risk assessment manager 110 that includes an identifier of the user, an optional identifier of the security item 112 and/or training item 124 and/or its template, the interaction(s) or an identifier of the interaction(s) performed, the collected technical information, the collected user property information and/or the like. The risk assessment manager 110 may receive this communication from the agent 142 and update a user profile 118 associated with the user, a template profile 116 associated with the template 114 (if any) from which the security item 112 and/or training item 124 was created, and/or a campaign profile 122 associated with the campaign (if any) for which the security item 112 and/or training item 124 was generated.

For example, the risk assessment manager 110 utilizes the user identifier within the communication from the agent 142 to identify the user profile 118 associated with the user. The risk assessment manager 110 then updates the information within the profile 118 to include the identifier of the security item 112 and/or training item 124 or template, the action(s) taken by the user with respect to the security item 112 and/or training item 124, the technical information associated with the user's system, and/or the user property information. One or more of these information sets may also be stored within the corresponding template and campaign profiles 116, 122 along with the user identifier, campaign identifiers, and template identifier where appropriate.

As discussed herein, if the user at user system 104, 106 performs a predefined interaction such as, viewing a video, incorrectly answering a question in a questionnaire, generating a username or password with a security level below a given threshold, selecting a hyperlink within a simulated phishing message, opens a file attached a simulated message, selects a hyperlink within a file attached to a simulated message, interacts with an application, responds to a challenge question, and/or performs some other action indicating a security risk, the user may be presented with one or more training items 124.

A training item 124 may include set of information displayed to a user when the user interacts with a security item 112 and/or training item 124 that in a predefined way such as by performing an action, answering a question, not viewing a training video, and/or the like, the user has exemplified a security risk to an organization's computing network. This set of information may notify the user of the interaction that exemplified a security risk (e.g., a question in the questionnaire answered incorrectly) and provide a proper interaction, response, and/or description to the user. Providing proper interactions, responses, and/or descriptions, which may include an audio/video file, may teach a user how to engage in secure behavior. A training item 124 may be presented to the user via a web page, an application, etc. and comprise text, audio, video, and/or a combination thereof.

If a security item 112 and/or training item 124 includes a message with a security-based threat, such as a hyperlink within the message and/or within a file attached to the security item 112 and/or training item 124, the Uniform Resource Locator (URL) associated with the hyperlink may be for a webpage comprising the training item 124. A webpage may be automatically displayed to the recipient when the recipient selects the hyperlink. A webpage may include text, audio, and/or video. A hyperlink may also point to a video file and/or audio file stored locally on the recipient's machine 104, 106, on a remote information processing system, and/or within the message 112 itself.

A hyperlink within a message may point to a webpage that includes the security-based threat. For example, the hyperlink may point to a webpage asking the user to enter personal and/or confidential information. Once the user enters the request information and selects an option to submit the information, a training item 124 may be displayed to the user. In embodiments where a security-based threat is a file attached to message, a training item 124 (e.g., webpage, video file, and/or audio file) may be displayed to the recipient upon opening the file. A file may include a script to automatically present the training item 124. Agent 142 may present the training item 124 to the user when the user performs a predefined action with respect to a security item 112 and/or training item 124 112.

If a security item 112 and/or training item 124 includes other interactive features (responding to questions, interacting with an application, challenge/response features, and/or the like), interacting with these features may trigger retrieval of a training item 124 and presentation of the training item 124 to a user to educate the user on proper interactions. Training items 124 may not be required to be associated with a template. For example, where a template includes a training item 124 such as a training video and quiz, a subsequent training item 124 may not be attached to the initial training item 124. As another example, where a user of security system 102 desires to provide training items 124 separate from security items 112, training items 124 may be sent at a later date and/or time after improper interaction with a security item 112. Training items 124 may be associated with individual security items 112 and/or training items 124, groups or types of security items 112 and/or training items 124, and/or the like.

FIG. 12 illustrates a training item 124 for the message of FIG. 11. In this non-limiting example, a training item 124 may be a webpage. After a user has been presented with a given number of training item 124 for messages of a given sophistication level (or of a given security-threat type), the risk assessment manager 110 may consider these users as "trained" for that sophistication level and/or security threat. Alternatively, the risk assessment manager 110 may consider a user as "trained" after the user has properly detected the security threats in a given number of security items 112 and/or training items 124. Other factors may also apply for determining when a recipient is proficient for a given sophistication level or security threat. Sophistication levels may be optional and a training item 124 may not be associated with a sophistication level.

In one embodiment, once an initial set of security items 112 and/or training items 124 have been transmitted to users and user systems 104, 106, the above processes may be repeated for any additional sets of security items 112 and/or training items 124 that are to be generated for a campaign. A campaign may be configured to send out security items 112 and/or training items 124 based on a plurality of templates according to one or more scheduling and/or delivery parameters/rules. For example, a campaign may indicate that five security items 112 and/or training items 124 with a low sophistication level are to be sent to the users within the first two weeks of the campaign, followed by five security items 112 and/or training items 124 with a medium sophistication level within the next two weeks of the campaign, followed by five security items 112 and/or training items 124 with a high sophistication level within the next two weeks of the campaign.

Item adjuster 218 may dynamically determine the type of security item 112 and/or training item 124 to be sent to the recipients based on a performance history with respect to previous security items 112 and/or training items 124 in the campaign and/or previous campaigns; a risk score; a role within the company; a company group; and/or the like. For example, if a user has successfully interacted with previous security items 112 and/or training items 124 at a given sophistication level, item adjuster 218 may dynamically update the campaign such that this user starts to receive security items 112 and/or training items 124 of a higher sophistication level (e.g., more difficult security-based questions, more legitimate looking simulated phishing messages, etc.).

The risk assessment manager 110 may end a campaign once a condition (e.g., specific date/time, number of messages, etc.) specific in the scheduling parameters has been met. Once a campaign has ended (or at any point in time during a campaign) a user risk calculator 212 may determine a risk score for a user associated with user system 104, 106. A risk score may be calculated after each security item 112 and/or training item 124 is presented to the user and/or after a given number of security items 112 and/or training items 124 have been presented to the user.

A risk score may be derived from historic behavioral user traits (i.e., the security item 112 and/or training item 124 interaction data), current and/or history user property data 136, and/or current and/or historic technical information 138 collected for the user during one or more campaigns. Using a risk score, a client subscribing to the risk assessment manager 110 may make better risk management decisions based on a level of risk each user exposes the organization to. Clients may apply differing levels of security rigor to a user within an organization. For example, a high-risk user may be denied Internet access, be placed in a restrictive firewall policy group, be denied remote access rights, restricted from handling sensitive information, and/or the like. Conversely, users that pose less risk (illustrated by a good risk score) may be permitted to increased network and system access based on the calculated risk score.

In one embodiment, the user risk calculator 212 may analyze the security item interaction data 132, the training item interaction data 134, user property data 136, and/or the technical information 138 of a given user with respect to a set of risk scoring metrics 126. FIGS. 13 and 14 illustrate various examples risk scoring metrics. For example, FIG. 13 shows examples of risk scoring metrics based on technical information and FIG. 14 shows examples of risk scoring metrics based on user security item interaction data 132 and user training item interaction data 134. A user risk score may be calculated at various granularities such as for each security item 112 and/or training item 124, a campaign in progress, for the most recent campaign completed, for all completed campaigns, and/or the like.

The user risk calculator 212 may compare the security item interaction data 132, the training item interaction data 134, user property data 136, and/or user technical information 138 collected for a given user with the set of risk scoring metrics 126 to calculate a risk score for the user. Collected data may be from a campaign currently in progress, the most recent campaign completed, for all completed campaigns, and/or the like. For example, if the user risk calculator 212 may determine that a user has a vulnerable plug-in installed on user system 104, 106 during a campaign. As another example, a user risk calculator 212 may determine, based on feedback from a campaign, that a user has browser software running with outdated versions. A comparison may be done to determine if the versions of the software contain vulnerabilities and if so, this may increase a risk score. As another example, a user risk calculator 212 may determine, based on feedback from a campaign, that a user consistently uses a mobile device and public WiFi networks. Accordingly, the risk score calculator 212 may determine that this feedback increases a risk score. As another example, risk calculator 212 may determine based on feedback from a campaign, that a user associated with user system 104, 106 has a large social media imprint (e.g., accesses social media platforms with a particular frequency). Accordingly, the risk calculator 212 may determine that this feedback increases a risk score. As another example, risk calculator 212 may determine based on feedback from a campaign that a user associated with user system 104, 106 is operating on a known malicious IP address and/or network and/or a country and/or region of origin. Accordingly, the risk calculator 212 may determine that this feedback increases a risk score. Accordingly, in these examples, a risk score of the recipient user may altered, such as those according to the metrics in FIG. 13.

As another example, if a user risk calculator 212 determines that the user opened a security-threat-based message in the campaign; clicked on a security-based threat in the campaign; and entered personal and/or confidential information into a simulated security-base threat, the risk score of the recipient user may altered by seventeen (17) according to the metrics in FIG. 14. If the user risk calculator 212 determines that the user completed three (3) training sessions during a campaign based on the user training item data 134, a risk score of the user is altered by 5%.

A risk score of a user may be determined on a per-item-basis and a multiplier may be applied to the risk score of a user based on the sophistication level of the item. For example, if the security item 112 and/or training item 124 included a low sophistication level a higher multiple is applied to the risk score than if the message comprises a high sophistication level. This may be because security threats within a message with a low sophistication level are easier to detect than security threats within a message with a higher sophistication level. Therefore, if a recipient interacts with a security threat within a message with a low sophistication level this user may be a greater risk to the client.

Risk scores may be increased by a multiplier depending on attributes associated with a security item 112 and/or training item 124. For example, if a user interacts with a security item 112 and/or training item 124 comprising a low sophistication level the points associated with the metrics shown in FIG. 14 may be multiplied by a factor of 3.

Similarly, if the recipient user is of high criticality (e.g., is exposed to highly sensitive or confidential information) to the company the points associated with the metrics shown in FIG. 14 may multiplied by a factor of 3.

Once a risk score has been determined for a given recipient user, a risk score may be saved and/or stored within the user profile 118 associated with the recipient user. Risk scores may be stored in other profiles as well. If a previous risk score is already associated with the user, this previous score may be updated with the new score. Alternatively, the user risk calculator 212 may store a new score in addition to any previously calculated scores for the user to maintain a history of risk scores for the user.

The calculated risk scores may be used to perform various actions. For example, the risk assessment manager 110 may use a calculated risk scores to influence, guide, and/or determine a frequency and/or sophistication level of future security items 112 and/or training items 124. For example, risk assessment manager 110 may increase the frequency of presenting security item 112 and/or training item 124 to a user who has a higher risk score than for a user with a lower risk score. In another example, the security items 112 and/or training items 124 with a higher sophistication level may be presented to a user with a lower risk score than to a user with a higher risk score. In another example, a more in-depth and detailed training item 124 or additional training items 124 may be presented to a user with a higher risk score than to a user with a lower risk score. As the user completes additional training sessions a risk score may be reduced.

In another embodiment, user risk scores may be used within technical security controls to determine how a user is treated at the technical level (e.g. firewall, proxy, or email restrictions, more detailed logging over user's activities, etc.). Users with higher risk scores may have more restrictions placed on them within the computing network than users with lower risk scores. As a user positively interacts (performs actions that do not compromise the security of the computing network) with security items 112 and/or training items 124, a risk score may reduce and less network restrictions may be imposed on the user.

The system may include a dataset of possible threat scenarios for which a context-aware cybersecurity training system may determine that a user is at risk. The system may include a dataset of associations between threat scenarios and associated actions that may indicate that a person who performs the actions may be at risk for the threat scenario. These associations may provide a basis for a training needs model (See FIG. 24). For example, threat scenarios and associated actions may include: (i) downloading malware from a malicious USB memory device; (ii) downloading a malicious app one one's smartphone; (iii) connecting to a rogue Wi-Fi access point; (iv) falling for a malicious SMS message by providing sensitive information in response to such a message or by performing, in response to the SMS message, some other action that puts one or one's organization at risk (e.g., changing a password as instructed in a malicious SMS message); and/or (iv) falling prey to a bluesnarfing attack resulting in the theft of sensitive information.

Optionally, the system may receive sensed data relating to the user actions and/or behavior, and it may apply rules to determine whether the user is at risk for the associated threat scenario. These rules may include analysis of the action or behavior itself (such as the content of information posted to a social network) to determine whether the action satisfies a threat criterion such as any content that identifies an employee by name, a social security number, a corporate name, device ID or other prohibited content). Sometimes, to determine whether a user is at risk or contributes to susceptibility to one or more threat scenarios, the policy manager may require that a threshold of one or more indicative user actions be sensed, or that a particular user action be repeated a threshold number of times, possibly over a given period of time. For instance, assessment of the risk associated with a user falling for a malicious SMS threat scenario can benefit from monitoring activities that include how often a user replies to mock malicious SMS messages. The logic used by the policy manager to drive this analysis (whether automatically or in the context of mixed initiative interaction scenarios) may rely on one or more rules and thresholds or some more complex logic. It may be manually entered by an analyst or system administrator, may be derived using statistical analysis and/or data mining techniques, may be obtained through benchmarking activities involving one or more organizations, or any combination of the above.

Also, the system may receive sensed action data for multiple users and store that data in correlation with relevant attributes of the data, such as identifying information for the multiple users (e.g., unique device IDs for different users), a date of the action or actions taken by the users, in a data set such as a user profile, user behavior data set, or historical user training data set, where the data may be organized by users.

An embodiment of a partial training needs model based on simple threshold levels is illustrated in FIG. 24. The model may associate various threat scenarios 2020 with various user actions 2030 that may be detected. When the system determines that a user action 2030 has been taken at least a threshold number of times 3010 in response to the threat scenario, the model will identify one or more training needs 3020 that should be provided to the user, optionally with priorities for the training needs. For instance, a user who replies to a mock malicious SMS message from his smartphone is identified as being at a high risk of falling for such an attack. The training needs model associated with this particular threat scenario based on this particular combination of contextual attributes (in this case simply the fact that the user replied to an SMS message from an unknown sender) indicates that the user is in a high need for being trained in the area of messaging and smart phone security, the identified training needs 3020 associated with this particular threat scenario as identified for this particular user in this particular context.

Elements of an embodiment of a slightly more complex training needs model 4000 including data based on one or more risk models is illustrated in FIG. 25A and FIG. 25B. In this embodiment, the training risk model includes an estimate 4020 of the susceptibility of a given user to fall victim to a given threat scenario 2020 over different periods of time. The susceptibility estimates 4020 may vary based on the different sensed activities 4040 and/or by established frequency thresholds 4050 above or below which the user may be considered at risk or likely not at risk for a particular threat scenario 4060. Susceptibility estimates 4020 can be probabilities, can be based on historical data, can be maintained by security analysts, or can be estimated with the help of statistical analysis and/or data mining techniques. Susceptibility estimates can be maintained for different time horizons such as 24-hour 4020 and I-week 4030 or other periods to help the policy manager 7 identify training interventions that may need to be more urgently delivered to the user, and training interventions that can be assigned to be taken within a longer time window (e.g. a few days, a week or even a month). Twenty-four-hour susceptibility and one-week susceptibility estimates may be related in different ways. For instance, some activities may be performed 5 days per week, whereas others may be performed at different frequencies (e.g., I day per month or 7 days per week).

Elements of the quantitative training needs model 4000 illustrated in FIG. 25 combine estimates of susceptibility and estimates of the incident cost 4010 associated with different threat scenarios to compute the risk associated with each threat scenario and possibly individual training needs for a given user in a given context. The training needs model 4000 also may include one or more costs of providing the user with training in response to the user being at risk for a threat scenario. Using the model illustrated in FIG. 25A and FIG. 25B, the system may implement a policy manager that identifies a combination of one or more training interventions that will best mitigate the various risks to which a given user is susceptible at a particular point in time. That identification may include prioritizing identified training interventions, including differentiating between interventions that should be delivered right away and interventions that can wait a bit longer before being exposed to the user.

Returning to FIG. 1, users of security system 102 may be able to view various types of reports 128 for a client subscribing to the risk assessment manager 110. A user of security system 102 may access an interactive environment 202 and selects a "Reports" widget 314 as indicated by the dashed box 1502 in FIG. 15. When a user selects this widget 314, a report area 1502 of the interactive environment 202 may be displayed within a portion of the interactive environment 202.

The report area 1504 may present the user with a list of campaigns 1504 associated with one or more clients for which the user is authorized to view. The user also may be presented with one or more options for selecting which campaigns are displayed. For example, a filtering option 1506 may allow a user of security system 102 to enter dates/times, which results in only the campaigns matching these criteria to be displayed (or filtered out). Another filtering option 1508 may allow a user to select all of the campaigns that are currently pending, running, or completed to be displayed. A search option 1510 may also be displayed to the user of security system 102, which may allow the user to enter one or more search keywords. Only campaigns matching the entered keywords may displayed to the user. Reports may include, for example, a campaign status and/or statistics as described herein.

Data presenter 216 may populate a table 1512 with the campaigns associated with a client or that match any of the search/filtering criteria entered by a user. Table 1512 may display the title 1514 of the campaign, the number of times 1516 each security item 112 and/or training item 124 in the campaign was sent; the number of times 1518 each of each security item 112 and/or training item 124 included a predefined action (e.g., open a message, click on a link, watch a video, attempt a password generation, and/or the like), a number of detected vulnerabilities 1520 (incorrect answers, incorrect interactions, and/or the like); the number of times 1522 each message resulted in a security compromise (e.g., recipient entered personal and/or confidential information, downloaded an insecure item, clicked on an insecure link, etc.); the number of multiple security compromises 1524 in each security item 112 and/or training item 124 for the same user (e.g., a user clicks on multiple insecure links, a user downloads multiple insecure items, a user answers multiple questions incorrectly, a combination of different security compromising actions, and/or the like); the number of users 1526 considered to have been "trained" during the campaign; the number of times 1528 users reported an applicable security item 112 and/or training item 124 to an administrator, manager, etc.; the starting date 1530 of the campaign the stopping date of the campaign; the status 1532 of the campaign (e.g., pending, running, completed, etc.); the user 1534 who created the campaign; and/or the like. Each campaign may have different reporting items and the reporting items listed above. For example, a campaign may include additional items and/or may not include all of the reporting items described above.

A user of security system 102 may be able to select one or more of the campaigns displayed in the table 1512 to view 1536 their details, delete 1538 the selected campaigns, clone 1540 the selected campaigns, compare 1542 multiple selected campaigns, and/or the like. In one example, campaigns may be compared based on any metrics discussed above. In addition, the risk scores of all users within an organization may be combined to calculate an overall risk score of the company. Trending data may then be displayed across multiple campaigns, against industry vertical, and/or across all clients of the risk assessment manager 110.

Figure 16:
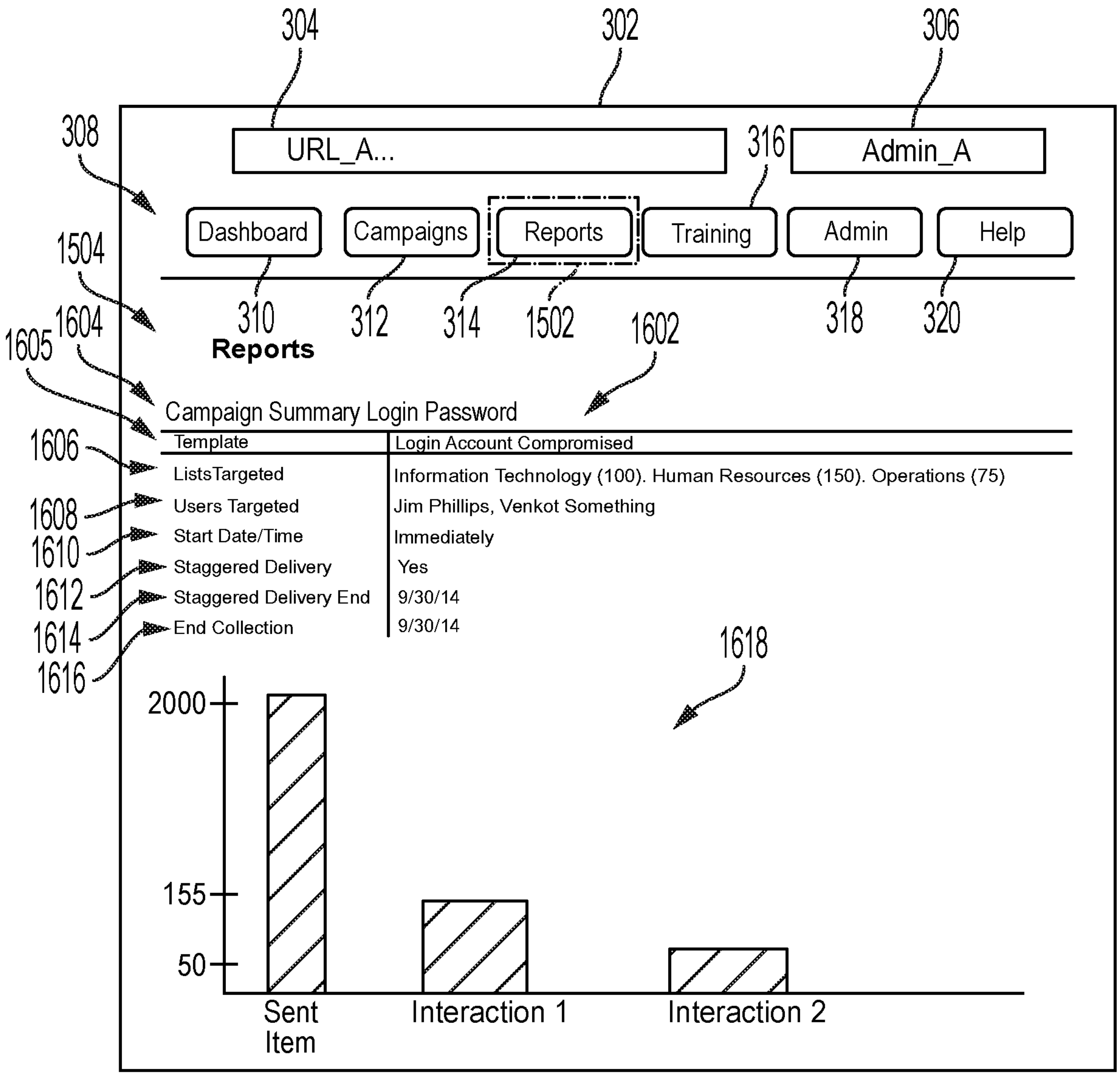
FIG. 16 depicts an example interactive environment presenting a campaign summary according to an embodiment of the disclosure.

When a user of security system 102 selects a campaign in the table 1512 a campaign summary 1602 comprising one or more reports may be displayed in the interactive environment 202, as shown in FIG. 16. This campaign summary 1602 may include information such as the campaign title 1604, template title 1605, user groups 1606, individual users 1608, start date/time 1610, staggered delivery 1612, staggered delivery end date/time (if applicable) 1614, campaign stop date 1616, and/or the like.

The campaign summary 1602 may also provide campaign statistics to the user in one or more different formats. For example, a campaign summary 1602 may include a graph 1618 displaying the statistics displayed in the table 1514 discussed above with respect to FIG. 15. It should be noted that the campaign statistics are not limited to those shown in FIG. 16.

Figure 17:
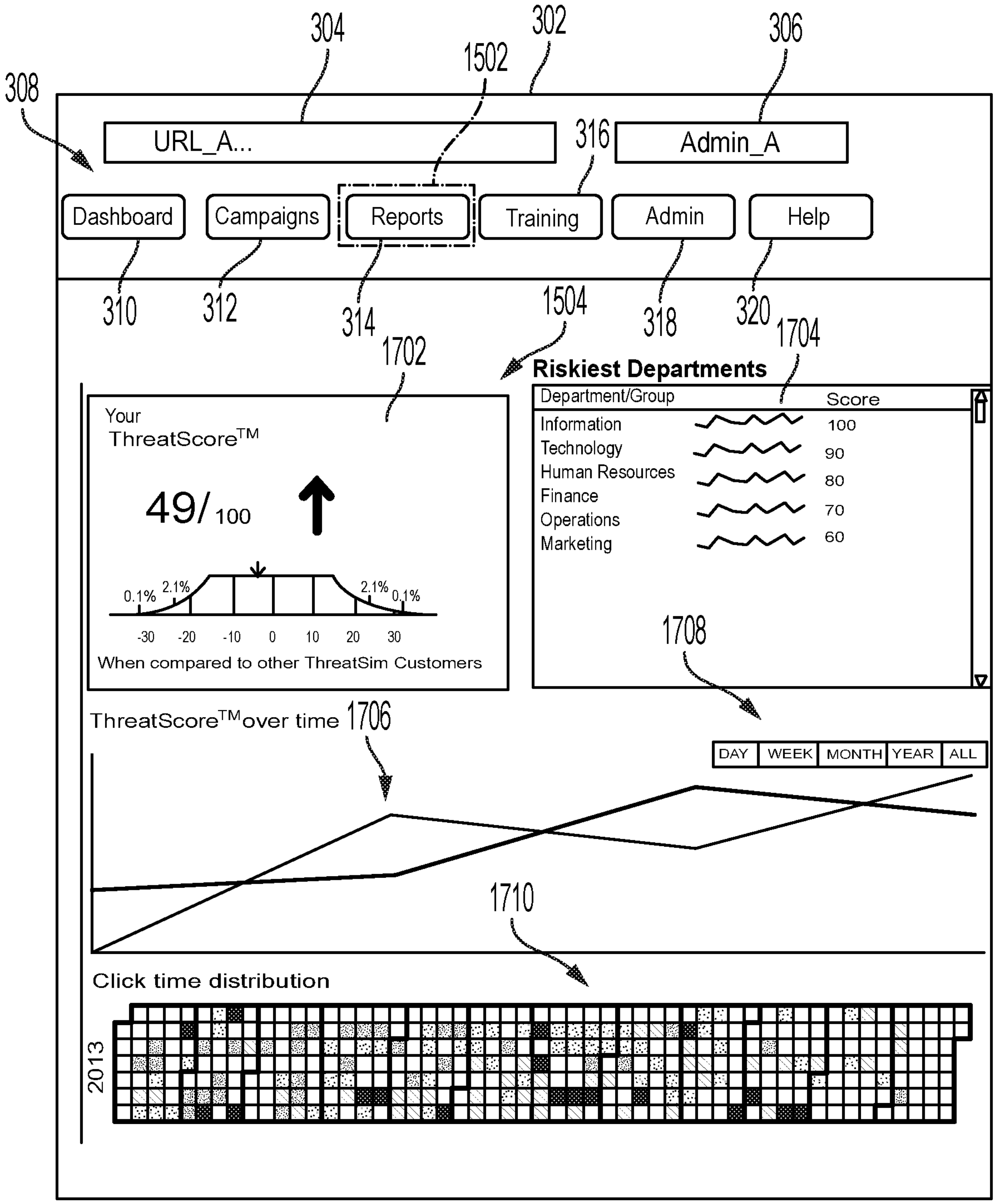
FIG. 17 depicts an example security item campaign report data for a given client presented in an interactive environment according to an embodiment of the disclosure.

FIG. 17 shows another example of information that may be displayed to the user of security system 102 as part of the campaign summary and/or report. For example, FIG. 17 illustrates an overall risk score 1702 has been calculated for the client when compared to other clients subscribing to the risk assessment manager 110. A client's overall risk score may be based on the risk score associated with its employees. A client's overall risk score may be calculated based on the metrics discussed above with respect to FIG. 15 (e.g., open/interactions/vulnerable/trained/reported/compromised).

A weighted score may be applied to each interaction between a user and a security item 112 and/or training item 124; whether that user is a repeat offender; whether that user interacts with security items 112 and/or training items 124 from different devices (laptop/tablet/phone) or multiple source IP addresses (work/home); whether that user interacted with security items 112 and/or training items 124 from vulnerable devices (out of date browser/plugins); whether that user completes training or reports applicable security items 112 and/or training items 124; and/or the like. Each interaction may be scored, and the aggregated scores may be normalized. The normalized scores may compared using a standard deviation calculation to arrive at a "ThreatScore". This ThreatScore may be compared against industry vertical or overall, and may be used to see trending data for users/groups/company (improving/declining) over time.

A client's risk score 1702 may be calculated in a real-time manner and/or according to various scripts that execute on a minute, hourly, daily, monthly, and/or a yearly basis. FIG.

17 illustrates a user may be displayed a list/graph of the risk scores 1704 for each group/department of a client. A group's risk score 1702 may be calculated based on the risk scores of the individuals within that group. For example, all of the risk scores of the individuals within a group may be added and/or the averaged to obtain the group's overall risk score 1702. A user of security system 102 may be able to select one or more of these groups to see a performance and/or technical information with respect to a given campaign, multiple campaigns, and/or all campaigns based on the group's employees.

FIG. 17 illustrates a graph 1706 that may be displayed to show a client's risk score over time. In this example, the user may be able to select a temporal-based filter 1708 to see how a client's risk score changed on a minute, hourly, daily, weekly basis, and/or monthly basis. FIG. 17 also illustrates a time distribution 1710 of user interactions with security items 112 and/or training items 124 during the selected campaign. In this example, a time distribution 1710 may display a year's worth of data, each discrete division representing days and further months. As an example, various graphical features may be used to illustrate campaign reporting. For example, the darker the shading may indicate more interactions with security items 112 and/or training items 124 on a particular day. This may be expanded to view a Month/Week/Day view and allow a viewer to identify when users are more likely to interact with a security item 112 and/or training item 124 such as early morning, late at night, at home vs. at office, etc.

Figure 18:
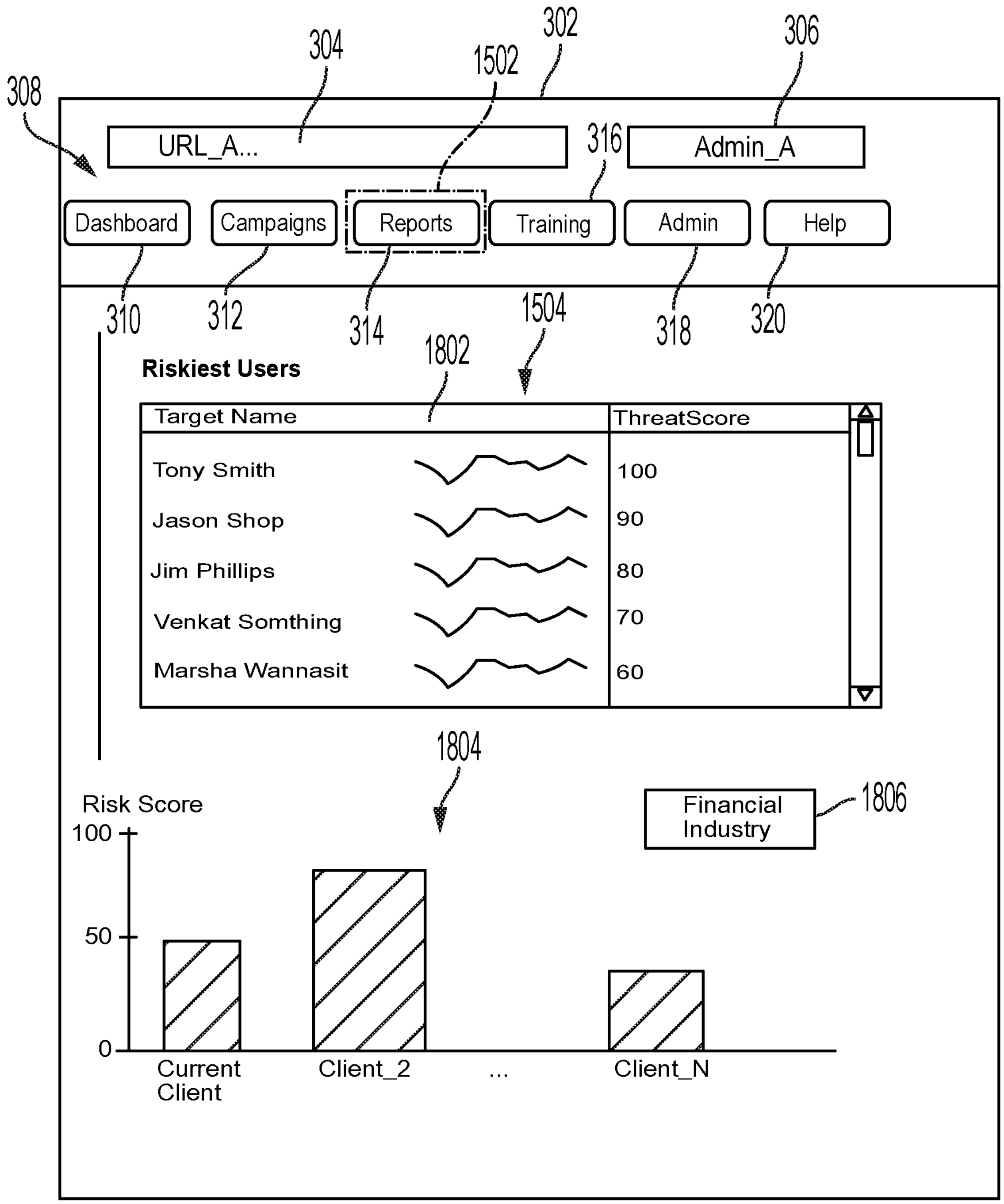
FIG. 18 depicts an example of security item campaign report data for a given client presented in an interactive environment according to an embodiment of the disclosure.

FIG. 18 illustrates a list/graph 1802 of risk scores for each employees, which may identify a company's riskiest and least risky employees. For example, a user may be able to select one or more of employees to see employee performance, property, and/or technical data with respect to a given campaign, multiple campaigns, and/or all campaigns participated in by the employee. FIG. 18 illustrates a graph 1804 that may be displayed to a user of security system 102 showing the client's risk score compare to other clients within a specific industry selected by the user. Graph 1804 may present the statistics displayed in the table 1514 discussed above for the client and for other clients in the selected industry. A user of security system 102 may be able to select the industry via one or more displayed options 1806 for which these metrics are displayed.

Figure 19:
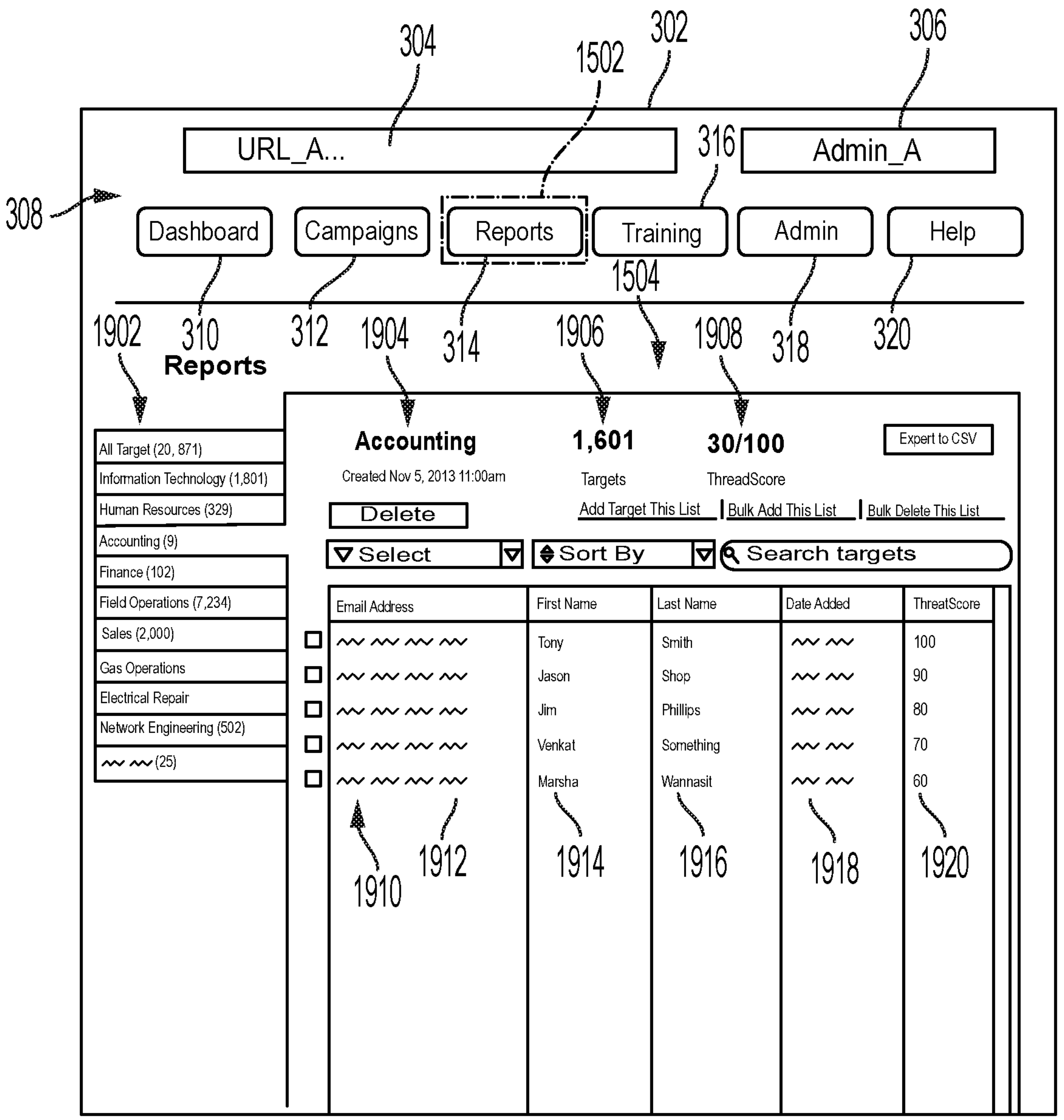
FIG. 19 depicts example report data associated with recipient groups of one or more campaigns for a given client presented in an interactive environment according to an embodiment of the disclosure.

FIG. 19 illustrates another report that may be presented to the user in the interactive environment 202. In the example shown in FIG. 19, a list of groups 1902 within the client may be displayed. This list may identify each group and the number of employees in each group. When a user selects a group from this list 1902, the data presenter 218 may display the name 1904 of the group; the number of users 1906 in the group; and the risk score 1908 of the group. The data presenter 218 may also display a list 1910 of each employee within the group. The employee's communication address 1912, first name 1914, last name 1916, the date 1918 the employee was added to the campaign, and risk score 1920 may also displayed to the user. The user may select one of the employees to view the statistics of the user for one or more campaigns or for all of the campaigns as a whole.

Statistics also may calculated on the data collected during one or more campaigns. For example, collected data may be analyzed and compared to data available from one or more data brokers. Accordingly, risk assessment manager 110 may predict if someone is more susceptible to security-threat-based messages based on their demographic data. For example, if an analysis of the data shows that people who shop at given store and drive a red van are more likely to interact with a security item 112 and/or training item 124 in a compromising manner, risk assessment manager 110 may score a user as more risky before they are sent a security-threat-based message.

Operational Flow

Figure 20:
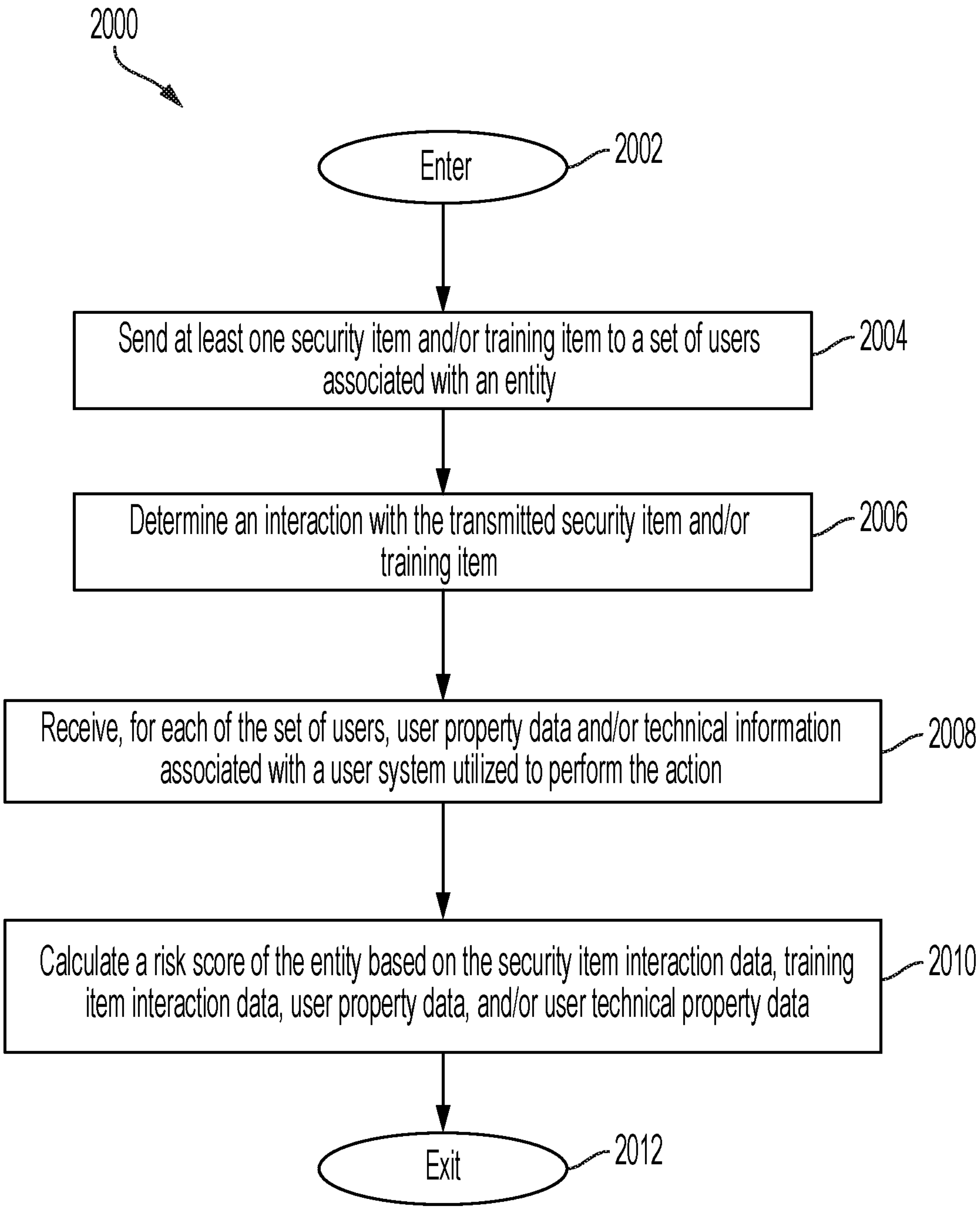
FIG. 20 depicts a flow diagram illustrating an example process for assessing security risks of users in computing networks according to an embodiment of the disclosure.

FIG. 20 illustrates an operational flow diagram according to an example embodiment. Method 2000 beings at step 2002 and flows direct to step 2004. If this is an introductory campaign (i.e., a client has no existing risk scores for its employees), the risk assessment manager 110, at step 2004, may obtain a campaign having a set of input data comprising at least one of security item 112 and/or training item 124. If this is not an introductory campaign, risk assessment manager may obtain security item interaction data 132, training item interaction data 134, user property data 136, and/or technical information 138 for each of a set of users in a plurality of users associated with an entity and/or a risk score associated with each user.

Based on the obtained data and/or other data required to send a security item 112 and/or training item 124 to a user system 104, 106 as described herein, security system may transmit the security item 112 and/or training item 124 to one or more users at user systems 104, 106 (block 2004).

At block 2006, risk assessment agent 142 and/or risk assessment manager 110 may determine an interaction with a security item 112 and/or a training item 124 as describe herein. This interaction may include security item interaction data 132 and/or training item interaction data 134, such as an action performed by each of the set of users with respect to at least one transmitted security item 112 and/or training item 124 presented to a user.

At block 2008, risk assessment manager 110 may receive, for each of the set of users, user property data and/or technical information associated with a user system utilized to perform the action as described herein. At block 2010, risk assessment manager may calculate a risk score of a user based on the security item interaction data, training item interaction data, user property data, and/or user technical property data. Risk assessment manager 110 may compares the set of input data associated with the security item 112 and/or training item 124 to a plurality of security risk scoring metrics. The plurality of security risk scoring metrics may include at various sets of metrics with different a weight assignments to different user actions for a network-based security item 112 and/or training item 124, security item interaction data 132, training item interaction data 134, user property data 136, and/or technical information 138. A security risk score may be calculated for each of the set of users with respect to a computing network based on comparison of the metrics and the received data. A security risk score may quantify a security risk presented to the computing network by each of the set of users. The risk assessment manager 110 may also present a set of data comprising each of the security risk scores that have been calculated via a user interface of security system 102. The control flow exits at block 2012.

Figure 21:
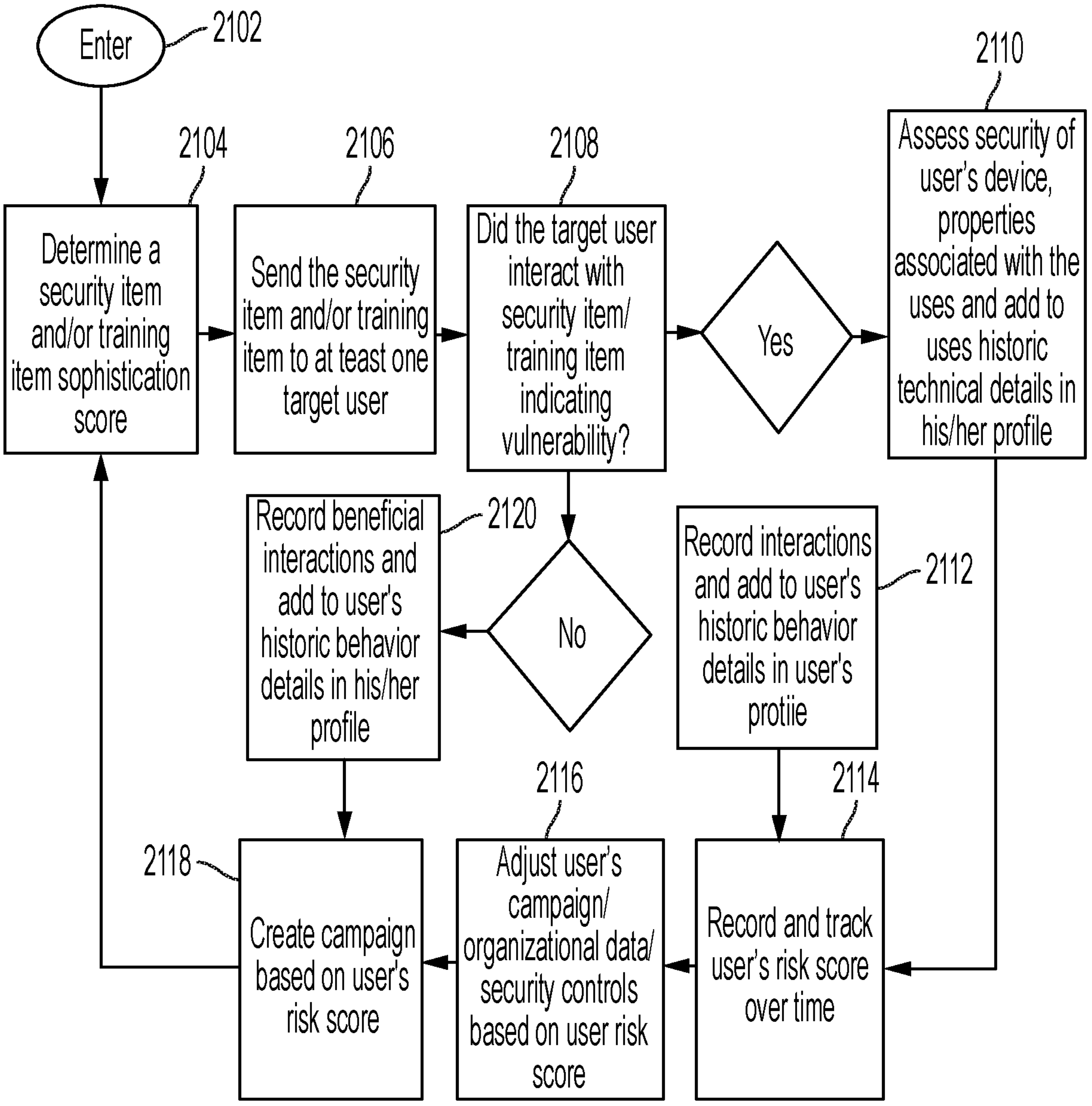
FIG. 21 depicts a flow diagram illustrating an example process for managing an entity's risk exposure to security items according to an embodiment of the disclosure.

FIG. 21 is an operational flow diagram illustrating an overall process for managing an entity's risk exposure to security threats according to an example embodiment. The operational flow of FIG. 21 may begin at block 2102. At block 2104, the risk assessment manager 110 may determine a sophistication score of a security item 112 and/or training item 124. A sophistication score of the security item 112 and/or training item 124 may be based on the sophistication score of its template 114 used to generate the security item 112 and/or training item 124.

At block 2106, the risk assessment manager 110 may transmit the security item 112 and/or training item 124 to at least one target user. At block 2108, the risk assessment manager 110 and/or risk assessment agent 142 may determine if the target user performs a predefined security item interaction and/or training item interaction that indicates a security vulnerability of the user. If this determination is positive, the risk assessment manager 110, at block 2110, may assess the security of the user's device 104 and/or user's properties and add the details of this assessment to the user's technical details and/or profile details in a profile 118. The risk assessment manager 110, at block 2112, may also record the user's security item interaction data and/or training item interaction data and add this action/behavior to the user's behavior details in a profile 118.

At block 2114, the risk assessment manager 110 may record and/or track a user's risk score over time. The risk assessment manager 110, at block 2116, may adjust a user's campaign, stored organizational data, security controls, and/or the like based on a calculated risk score. In another example, risk assessment manager 110 may not perform any adjustments but instead may report recommended adjustments to a client. The risk assessment manager 110, at block 2118, may create a new campaign based on a user's risk score. The control flow may return to block 2014 or may end at this point. If the result of the determination at block 2108 is negative, the risk assessment manager 110, at block 2120, may record that the user does not display vulnerable behavior and add this behavior/action to a user's behavior details in his/her profile 118. The control then flows to step 2118.

Information Processing System

Figure 22:
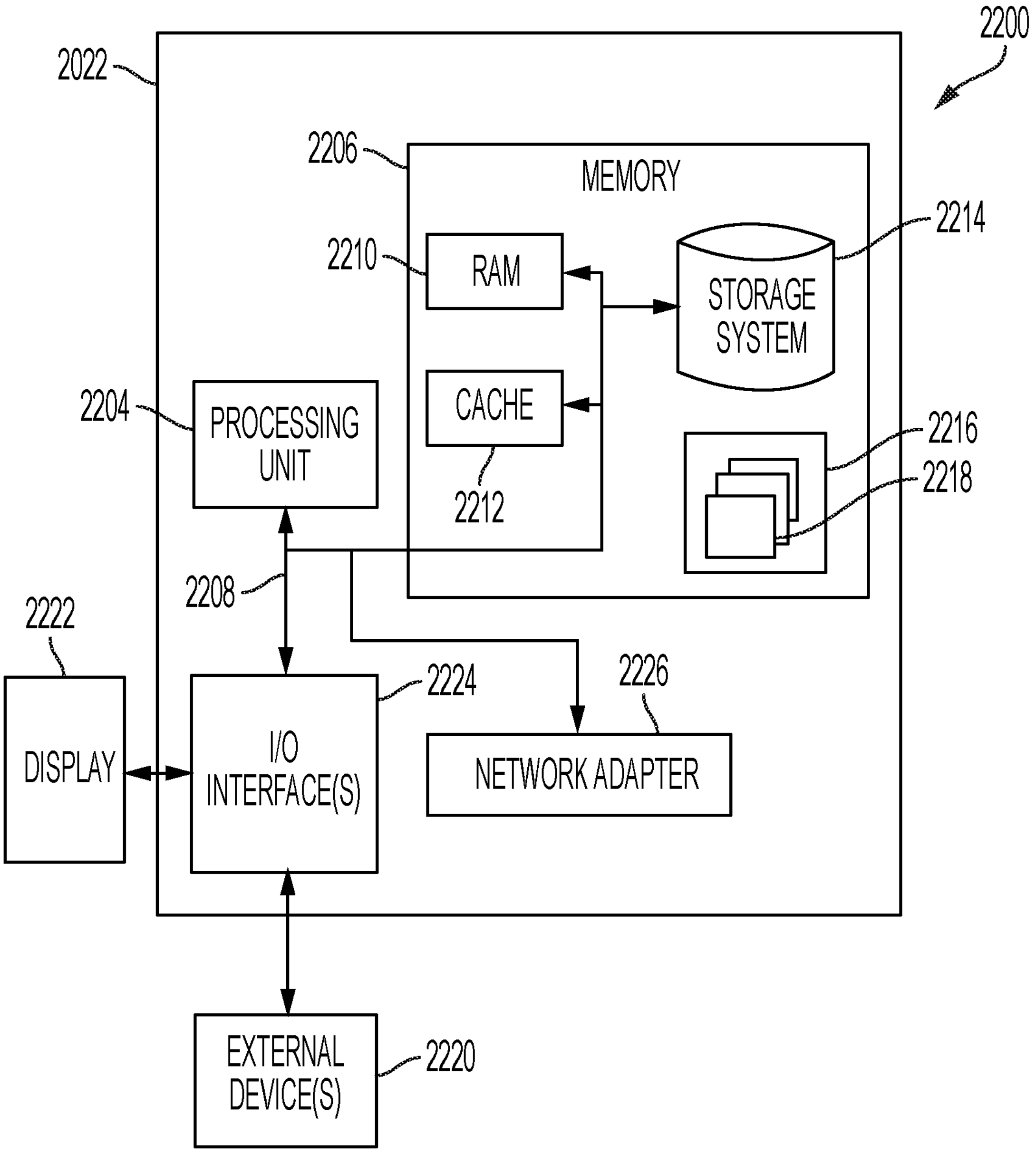
FIG. 22 depicts a block diagram illustrating an example information processing system according to an embodiment of the disclosure.

FIG. 22 shows a block diagram illustrating an information processing system 2200 that may be utilized in various embodiments of the present disclosure such as the security system 102 and/or user system 104, 106 shown in FIG. 1. The information processing system 2202 may implement one or more embodiments of the present disclosure. A processing system may be used as the information processing system 2202 in embodiments of the present disclosure. The components of the information processing system 2202 may include, but are not limited to, one or more processors or processing units 2204, a system memory 2206, and a bus 2208 that couples various system components including the system memory 2206 to the processor 2204.

The bus 2208 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 22, the main memory 2206 may include at least the risk assessment manager 110 and the security items messages 112, security item templates 114, template profiles 116, user/employee profiles 118, client profiles 120, campaign profiles 122, training items 124, risk metrics 126, campaign reports 128, sophistication metrics 130, security item interaction data 131, training item interaction data 133, and user technical information 138 shown in FIG. 1. The risk assessment manager 110 may reside within the processor 2204, or be a separate hardware component. The system memory 2206 may also include computer system readable media in the form of volatile memory, such as random access memory (RAM) 2210 and/or cache memory 2212. The information processing system 2202 may include other removable/non-removable, volatile/non-volatile computer system storage media. By way of example only, a storage system 2214 may be provided for reading from and writing to a non-removable or removable, non-volatile media such as one or more solid state disks and/or magnetic media. A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 2208 by one or more data media interfaces. The memory 2206 may include at least one program product having a set of program modules configured to carry out the functions of an embodiment of the present disclosure.

Program/utility 2216, may have a set of program modules 2218, may be stored in memory 2206 by way of example, and not limitation, as well as an operating system, one or more application programs, other program modules, and program data. Each of the operating system, one or more application programs, other program modules, and program data or some combination thereof, may include an implementation of a networking environment. Program modules 2218 may carry out the functions and/or methodologies of embodiments of the present disclosure.

The information processing system 2202 may also communicate with one or more external devices 2220 such as a keyboard, a pointing device, a display 2222, etc.; one or more devices that enable a user to interact with the information processing system 2202; and/or any devices (e.g., network card, modem, etc.) that enable computer system/server 2202 to communicate with one or more other computing devices. Such communication may occur via I/O interfaces 2224. The information processing system 2202 may communicate with one or more networks such as a local area network (LAN), a general wide area network (WAN), and/or a public network (e.g., the Internet) via network adapter 2226. As depicted, the network adapter 2226 may communicate with the other components of information processing system 2202 via the bus 2208. Other hardware and/or software components may also be used in conjunction with the information processing system 2202. Examples include, but are not limited to: microcode, device drivers, redundant processing units, external disk drive arrays, RAID systems, tape drives, and data archival storage systems.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit"," "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Also, the phrase "such as" is not intended to limit the disclosure to any particular item being referred to. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method, comprising:

at a security system comprising at least one processor and memory:

generating an interaction item, wherein the interaction item comprises one or more of a training item or a security item;

transmitting the interaction item to an end user electronic device via a network;

receiving feedback data from the end user electronic device, wherein the feedback data comprises sensed data relating to an action of a user of the end user electronic device associated with the interaction item, and wherein the feedback data comprises technical information associated with the end user electronic device;

comparing the feedback data to a plurality of security risk scoring metrics;

based on comparing the feedback data to the plurality of security risk scoring metrics, determining a security risk score, wherein the security risk score quantifies a cybersecurity risk presented by the user of the end user electronic device;

generating a subsequent interaction item based on the security risk score, wherein the subsequent interaction item comprises one or more of a training item or a security item, and wherein the subsequent interaction item includes a number of fields, each field of the number of fields having an associated value;

assigning a weight to each field of the number of fields based on the field's associated value; and determining a sophistication score for the subsequent interaction item by totaling the weights associated with each field of the number of fields.

2. The method of claim 1, wherein the plurality of security risk scoring metrics comprise:

a set of metrics assigning a weight to the action of the user of the end user electronic device associated with the interaction item, and a set of metrics assigning a weight to a technical attribute defined for the technical information associated with the end user electronic device.

3. The method of claim 2, wherein the technical information comprises one or more of a network address, a device make, a device model, a software version, an operating system version, firewall data, or a platform type.

4. The method of claim 1, wherein receiving the feedback data from the end user electronic device comprises receiving data sensed by a sensor of the end user electronic device.

5. The method of claim 1, wherein receiving the feedback data from the end user electronic device comprises receiving security item interaction data received at the end user electronic device via an input/output interface.

6. The method of claim 1, wherein receiving the feedback data from the end user electronic device comprises receiving training item interaction data received at the end user electronic device via an input/output interface, the training item interaction data comprising completion data.

7. The method of claim 1, comprising:

adjusting a frequency of presenting one or more subsequent interaction items to the user of the end user electronic device based on the security risk score.

8. The method of claim 1, comprising:

adjusting a sophistication score of one or more subsequent interaction items presented to the user of the end user electronic device based on the security risk score.

9. The method of claim 1, comprising:

adjusting network security controls for the user of the end user electronic device based on the security risk score.

10. The method of claim 1, wherein generating the interaction item comprises generating one or more of a simulated security item, a simulated training item, an actual security item, or an actual training item.

11. The method of claim 1, comprising:

causing the end user electronic device to present the subsequent interaction item to the user of the end user electronic device, wherein the subsequent interaction item instructs the user of the end user electronic device on how to interact with at least one security item; and recording an indication that the user of the end user electronic device interacted with the subsequent interaction item based on the subsequent interaction item being presented by the end user electronic device.

12. The method of claim 1, comprising:

identifying one or more additional users to form a group of users; and calculating a collective security risk score for the group of users based on an individual risk score calculated for each user in the group of users.

13. A security system, comprising:

at least one processor; and memory storing instructions that, when executed by the at least one processor, cause the security system to:

generate an interaction item, wherein the interaction item comprises one or more of a training item or a security item;

transmit the interaction item to an end user electronic device via a network;

receive feedback data from the end user electronic device, wherein the feedback data comprises sensed data relating to an action of a user of the end user electronic device associated with the interaction item, and wherein the feedback data comprises technical information associated with the end user electronic device;

compare the feedback data to a plurality of security risk scoring metrics;

based on comparing the feedback data to the plurality of security risk scoring metrics, determine a security risk score, wherein the security risk score quantifies a cybersecurity risk presented by the user of the end user electronic device;

generate a subsequent interaction item based on the security risk score, wherein the subsequent interaction item comprises one or more of a training item or a security item, and wherein the subsequent interaction item includes a number of fields, each field of the number of fields having an associated value;

assign a weight to each field of the number of fields based on the field's associated value; and determine a sophistication score for the subsequent interaction item by totaling the weights associated with each field of the number of fields.

14. The security system of claim 13, wherein the plurality of security risk scoring metrics comprise:

a set of metrics assigning a weight to the action of the user of the end user electronic device associated with the interaction item, and a set of metrics assigning a weight to a technical attribute defined for the technical information associated with the end user electronic device.

15. The security system of claim 14, wherein the technical information comprises one or more of a network address, a device make, a device model, a software version, an operating system version, firewall data, or a platform type.

16. The security system of claim 13, wherein receiving the feedback data from the end user electronic device comprises receiving data sensed by a sensor of the end user electronic device.

17. The security system of claim 13, wherein receiving the feedback data from the end user electronic device comprises receiving security item interaction data received at the end user electronic device via an input/output interface.

18. The security system of claim 13, wherein receiving the feedback data from the end user electronic device comprises receiving training item interaction data received at the end user electronic device via an input/output interface, the training item interaction data comprising completion data.

19. The security system of claim 13, wherein the memory stores additional instructions that, when executed by the at least one processor, cause the security system to:

adjust a frequency of presenting one or more subsequent interaction items to the user of the end user electronic device based on the security risk score.

20. One or more non-transitory computer-readable media storing instructions that, when executed by a security system comprising at least one processor and memory, cause the security system to:

generate an interaction item, wherein the interaction item comprises one or more of a training item or a security item;

transmit the interaction item to an end user electronic device via a network;

receive feedback data from the end user electronic device, wherein the feedback data comprises sensed data relating to an action of a user of the end user electronic device associated with the interaction item, and wherein the feedback data comprises technical information associated with the end user electronic device;

compare the feedback data to a plurality of security risk scoring metrics;

based on comparing the feedback data to the plurality of security risk scoring metrics, determine a security risk score, wherein the security risk score quantifies a cybersecurity risk presented by the user of the end user electronic device;

generate a subsequent interaction item based on the security risk score, wherein the subsequent interaction item comprises one or more of a training item or a security item, and wherein the subsequent interaction item includes a number of fields, each field of the number of fields having an associated value;

assign a weight to each field of the number of fields based on the field's associated value; and determine a sophistication score for the subsequent interaction item by totaling the weights associated with each field of the number of fields.

* * * * *